(12) United States Patent
Kanterakis et al.

(10) Patent No.: US 6,574,267 B1
(45) Date of Patent: Jun. 3, 2003

(54) RACH RAMP-UP ACKNOWLEDGEMENT

(75) Inventors: Emmanuel Kanterakis, North Brunswick, NJ (US); Kourosh Parsa, Riverside, CT (US)

(73) Assignee: Golden Bridge Technology, Inc., West Long Branch, NJ (US)

(*) Notice: Subject to any disclaimer, the term of this patent is extended or adjusted under 35 U.S.C. 154(b) by 0 days.

(21) Appl. No.: 09/273,450

(22) Filed: Mar. 22, 1999

(51) Int. Cl.[7] .............................. H04B 1/69; H04B 7/216
(52) U.S. Cl. ........................................ 375/141; 370/342
(58) Field of Search ................................ 375/130, 141; 370/342, 335, 320, 321, 324, 441

(56) References Cited

U.S. PATENT DOCUMENTS

| | | | |
|---|---|---|---|
| 5,103,459 A | * | 4/1992 | Gilhousen ............... 375/130 |
| 5,280,472 A | | 1/1994 | Gilhousen et al. |
| 5,305,308 A | | 4/1994 | English et al. |
| 5,329,550 A | | 7/1994 | Rousseau et al. |
| 5,384,777 A | | 1/1995 | Ahmadi et al. |
| 5,461,639 A | | 10/1995 | Wheatley, III et al. |
| 5,537,397 A | | 7/1996 | Abramson |
| 5,544,196 A | | 8/1996 | Tiedermann, Jr. et al. |
| 5,673,259 A | | 9/1997 | Quick, Jr. |
| 5,802,465 A | | 9/1998 | Hamalainen et al. |
| 5,825,835 A | | 10/1998 | Kingston et al. |
| 5,841,768 A | | 11/1998 | Ozluturk et al. |
| 5,850,602 A | | 12/1998 | Tisdale et al. |
| 5,875,182 A | | 2/1999 | Hatzipapafotiou |
| 5,893,036 A | | 4/1999 | Trandai et al. |
| 5,894,472 A | | 4/1999 | de Seze |
| 5,933,777 A | | 8/1999 | Rahman |

(List continued on next page.)

FOREIGN PATENT DOCUMENTS

| | | |
|---|---|---|
| GB | 2 318 256 | 4/1998 |
| WO | WO 97/29596 | 8/1997 |

OTHER PUBLICATIONS

Dong In Kim et al., "Random Assignment/Transmitter Oriented Code Scheme for Centralized DS/SSMA Packet Radio Networks," IEEE Journal on Selected Area in Communication, vol. 14, No. 8, Oct. 1996, pp. 1560–1568.

Riaz Esmailzadeh et al. "A New Slotted ALOHA Based Random Access Method for CDMA Systems," IEEE, ICUPC 1997, pp. 43–47.

Primary Examiner—Tesfaldet Bocure
(74) Attorney, Agent, or Firm—McDermott, Will & Emery

(57) ABSTRACT

An improvement to a code-division-multiple-access (CDMA) system employing spread-spectrum modulation, with the CDMA system having a base station (BS) with a BS-spread-spectrum transmitter and a BS-spread-spectrum receiver, and a plurality of remote stations. Each remote station (RS) has an RS-spread-spectrum transmitter and an RS-spread-spectrum receiver. The improvement includes the steps of transmitting from the BS-spread-spectrum transmitter, a broadcast common-synchronization channel. The broadcast common-synchronization channel has a common chip-sequence signal common to the plurality of remote stations, and a frame-timing signal. The improvement includes receiving at a first RS-spread-spectrum receiver the broadcast common-synchronization channel, and determining frame timing from the frame-timing signal, and transmitting from a first RS-spread-spectrum transmitter an access-burst signal. The access-burst signal has a plurality of segments, which have a plurality of power levels. At the BS-spread-spectrum receiver the access-burst signal is received at a detected-power level. In response to receiving the access-burst signal, the BS-spread-spectrum transmitter transmits to the first RS-spread-spectrum receiver an acknowledgment signal. The first RS-spread-spectrum receiver receives the acknowledgment signal, and in response to receiving the acknowledgment signal, the first RS-spread-spectrum transmitter transmits to the BS-spread-spectrum receiver, a spread-spectrum signal having data.

29 Claims, 11 Drawing Sheets

U.S. PATENT DOCUMENTS

| | | |
|---|---|---|
| 5,943,327 A | 8/1999 | Mademann |
| 5,953,369 A | 9/1999 | Suzuki |
| 5,982,763 A | 11/1999 | Sato |
| 5,991,308 A | 11/1999 | Fuhrmann et al. |
| 6,009,089 A | 12/1999 | Huang et al. |
| 6,011,788 A | 1/2000 | Hurst et al. |
| 6,026,081 A | 2/2000 | Hamabe |
| 6,031,832 A | 2/2000 | Turina |
| 6,038,223 A | 3/2000 | Hansson et al. |
| 6,038,250 A | 3/2000 | Shou et al. |
| 6,091,757 A | 7/2000 | Cudak et al. |
| 6,141,337 A | 10/2000 | Uta et al. |
| 6,141,373 A | 10/2000 | Scott |
| 6,144,841 A | 11/2000 | Feeny |
| 6,163,533 A * | 12/2000 | Esmailzadeh et al. ...... 370/342 |
| 6,169,759 B1 | 1/2001 | Kanterakis et al. |
| 6,256,301 B1 | 6/2001 | Gilleo et al. |
| 6,301,286 B1 | 10/2001 | Kanterakis et al. |

* cited by examiner

| $g_{k,0}A$ | $g_{k,1}A$ | $g_{k,2}A$ | --- | $g_{k,N-1}A$ |

FIG 8(A)

| $g_{k,0}A_{k,i0}$ | $g_{k,1}A_{k,i1}$ | $g_{k,2}A_{k,i2}$ | --- | $g_{k,N-1}A_{k,i(N-1)}$ |

FIG 8(B)

$A_{k,ij} \in [A_0, A_1, A_2, \ldots, A_{N-1}]$ $A_{k1,ij} \neq A_{k2,ij}$ $A_{k,ij} \in [A_0, A_1, A_2, \ldots, A_{N-1}]$ $A_{k1,ij} \neq A_{k2,ij}$

RACH RAMP-UP ACKNOWLEDGEMENT

BACKGROUND OF THE INVENTION

This invention relates spread-spectrum communications, and more particularly to code-division-multiple-access (CDMA) cellular, collision detection for packet-switched systems.

DESCRIPTION OF THE RELEVANT ART

Presently proposed for a standard is a random-access burst structure which has a preamble followed by a data portion. The preamble has 16 symbols, the preamble sequence, spread by an orthogonal Gold code. A mobile station acquires chip and frame synchronization, but no consideration is given to closed-loop power control or collision detection.

An objective is to provide random channel access with reliable high data throughput and low delay on CDMA systems.

Another object of the invention is to maintain reliability for high data throughput and low delay on CDMA systems.

According to the present invention, as embodied and broadly described herein, an improvement to a code-division-multiple-access (CDMA) system employing spread-spectrum modulation, is provided. The CDMA system has a base station (BS) and a plurality of remote stations. The base station has BS-spread-spectrum transmitter and a BS-spread-spectrum receiver. Each of the plurality of remote stations has an RS-spread-spectrum transmitter and an RS-spread-spectrum receiver. The method comprises the steps of transmitting from the BS-spread-spectrum transmitter, a broadcast common-synchronzation channel having a common chip-sequence signal common to the plurality of remote stations. The broadcast common-synchronization channel has a frame-timing signal.

At a first RS-spread-spectrum receiver, the steps further include receiving the broadcast common-synchronization channel. From the broadcast common-synchronization channel, the steps include determining frame timing at the first RS-spread-spectrum receiver from the frame-timing signal.

From a first RS-spread-spectrum transmitter, the steps include transmitting an access-burst signal. The access-burst signal has a multiple segments at different power levels, that is to say typically at sequentially increasing power levels.

The BS-spread-spectrum receiver receives at least one segment of the access burst signal at a detectable power level. In response, the BS-spread-spectrum transmitter sends an acknowledgment signal back to the first RS-spread-spectrum receiver. Receipt of the acknowledgment signal by the first RS-spread-spectrum receiver causes the RS-spread-spectrum transmitter to send data to the BS-spread-spectrum receiver. The detection of the segment at an adequate power level, acknowledgment communication and subsequent data transmission provides the remote station (RS) with random access to the channel (RACH).

The preferred embodiment also provides that when there is a collision of a first access-burst signal with a collision access-burst signal, then the BS-spread-spectrum receiver does not correctly receive the collision-detection portion of the first access-burst signal. Thus, the BS-spread-spectrum transmitter transmits to the first RS-spread-spectrum receiver, an collision-detection without reflecting the collision-detection portion. At the first RS-spread-spectrum receiver, in response to receiving the collision-detection signal without the collision detection portion, the first RS-spread-spectrum transmitter transmits to the BS-spread-spectrum receiver, a second access-burst signal.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

FIG. 8 shows the structure of the preamble;

DETAILED DESCRIPTION OF THE PREFERRED EMBODIMENTS

Figure 1:
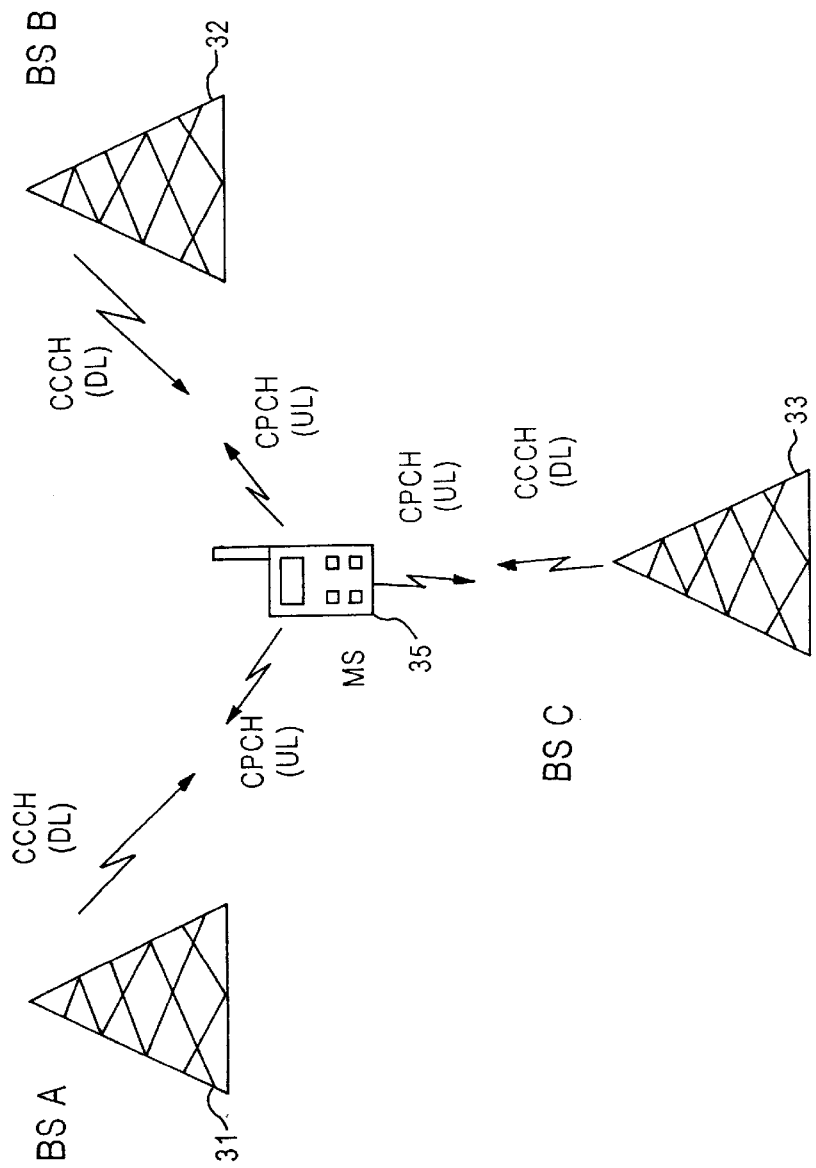
FIG. 1 is a common packet channel system block diagram with a common control downlink channel.

Reference now is made in detail to the present preferred embodiments of the invention, examples of which are illustrated in the accompanying drawings, wherein like reference numerals indicate like elements throughout the several views.

The common-packet channel is a new and novel uplink transport channel for transmitting variable size packets from a mobile station to a base sation within listening range, without the need to obtain a two way link with any one or set of base stations. The channel resource allocation is contention based; that is, a number of mobile stations could at any time content for the same resources, as found in an ALOHA system.

In the exemplary arrangement shown in FIG. 1, common-packet channel provides an improvement to a code-division-multiple-access (CDMA) system employing spread-spectrum modulation. The CDMA system has a plurality of base stations (BS) 31, 32, 33 and a plurality of remote stations (RS). Each remote station 35 has an RS-spread-spectrum transmitter and an RS-spread-spectrum receiver. An uplink is from the remote station 35 to a base station 31. The uplink has the common-packet channel (CPCH). A downlink is from a base station 31 to the remote station 35, and is denoted a common-control channel (CCCH). The common-control channel has common signaling used by the plurality of remote stations.

Figure 2:
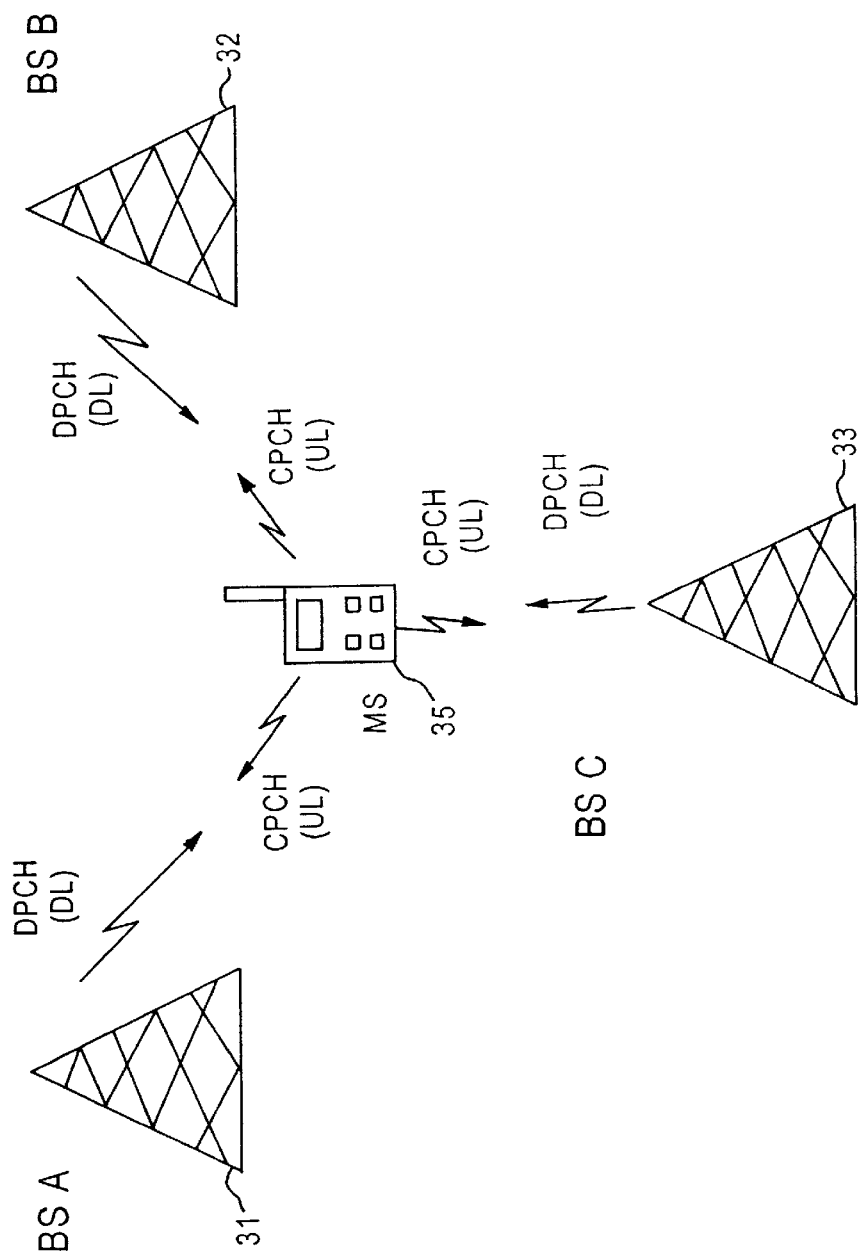
FIG. 2 is common packet channel system block diagram with a dedicated downlink channel.

An alternative to the common-control channel, but still using the common-packet channel, is the downlink dedicated physical channel (DPCH), shown in FIG. 2. The dedicated downlink channel, has signaling that is used for controlling a single remote station.

Figure 3:
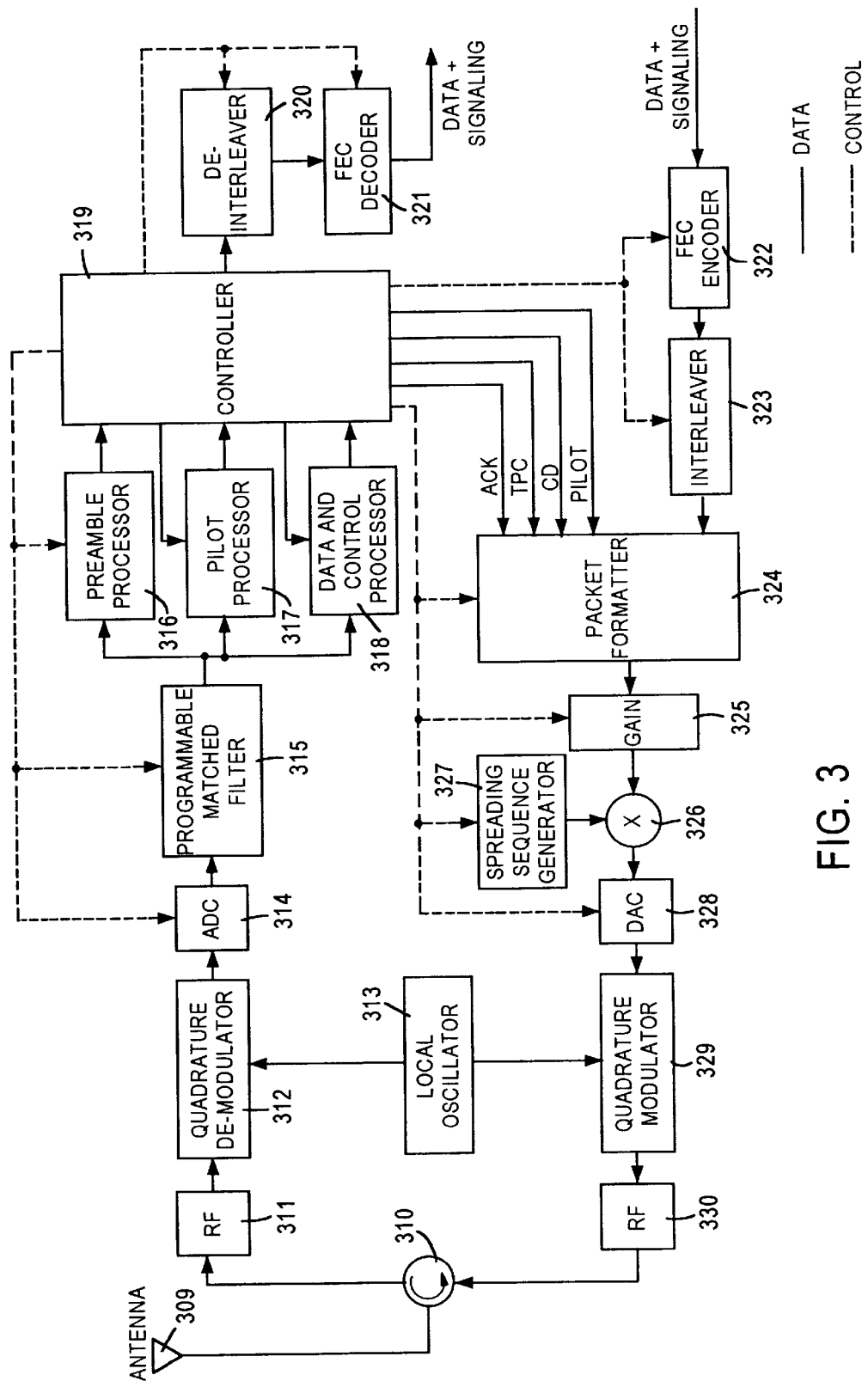
FIG. 3 is a block diagram of a base station receiver for common packet channel.

As illustratively shown in FIG. 3, a BS spread-spectrum transmitter and a BS spread-spectrum receiver is shown. The BS spread-spectrum transmitter and the BS spread-spectrum receiver are located at the base station 31. The BS spread-spectrum receiver includes an antenna 309 coupled to a circulator 310, a receiver radio frequency (RF) section 311, a local oscillator 313, a quadrature demodulator 312, and an analog-to-digital converter 314. The receiver RF section 311 is coupled between the circulator 310 and the quadrature demodulator 312. The quadrature demodulator is coupled to the local oscillator 313 and to the analog to digital converter 314. The output of the analog-to-digital converter 315 is coupled to a programmable-matched filter 315.

A preamble processor 316, pilot processor 317 and data-and-control processor 318 are coupled to the programmable-matched filter 315. A controller 319 is coupled to the preamble processor 316, pilot processor 317 and data-and-control processor 318. A de-interleaver 320 is coupled between the controller 319 and a forward-error-correction (FEC) decoder 321.

The BS spread-spectrum transmitter includes a forward-error-correction (FEC) encoder 322 coupled to an interleaver 323. A packet formatter 324 is coupled to the interleaver 323 and to the controller 319. A variable gain device 325 is coupled between the packet formatter 324 and a product device 326. A spreading-sequence generator 327 is coupled to the product device 326. A digital-to-analog converter 328 is coupled between the product device 328 and quadrature modulator 329. The quadrature modulator 329 is coupled to the local oscillator 313 and a transmitter RF section 330. The transmitter RF section 330 is coupled to the circulator 310.

The controller 319 has control links coupled to the analog-to-digital converter 314, programmable-matched filter 315, preamble processor 316, the digital-to-analog converter 328, the spreading sequence generator 327, the variable gain device 325, the packet formatter 324, the de-interleaver 320, the FEC decoder 321, the interleaver 323 and the FEC encoder 322.

A received spread-spectrum signal from antenna 309 passes through circulator 310 and is amplified and filtered by receiver RF section 311. The local oscillator 313 generates a local signal which quadrature demodulator 312 uses to demodulator in-phase and quadrature phase components of the received spread-spectrum signal. The analog-to-digital converter 314 converts the in-phase component and the quadrature-phase component to a digital signal. These functions are well known in the art, and variations to this block diagram can accomplish the same function.

The programmable-matched filter 315 despreads the received spread-spectrum signal. A correlator, as an alternative, may be used as an equivalent means for despeading the received spread-spectrum signal.

The preamble processor 316 detects the preamble portion of the received spread-spectrum signal. The pilot processor detects and synchronizes to the pilot portion of the received spread-spectrum signal. The data and control processor detects and processes the data portion of the received spread-spectrum signal. Detected data passes through the controller 319 to the de-interleaver 320 and FEC decoder 321. Data and signaling are outputted from the FEC decoder 321.

In the BS transmitter, data are FEC encoded by FEC encoder 322, and interleaved by interleaver 323. The packet formatter formats data, signaling, acknowledgment signal, collision detection signal, pilot signal and transmitting power control (TPC) signal into a packet. The packet is outputted from packet formatter, and the packet level is amplified or attenuated by variable gain device 325. The packet is spread-spectrum processed by product device 326, with a spreading chip-sequence from spreading-sequence generator 327. The packet is converted to an analog signal by digital-to-analog converter 328, and in-phase and quadrature-phase components are generated by quadrature modulator 329 using a signal from local oscillator 313. The packet is translated to a carrier frequency, filtered and amplified by transmitter RF section 330, and then passes through circulator 310 and is radiated by antenna 309.

Figure 4:
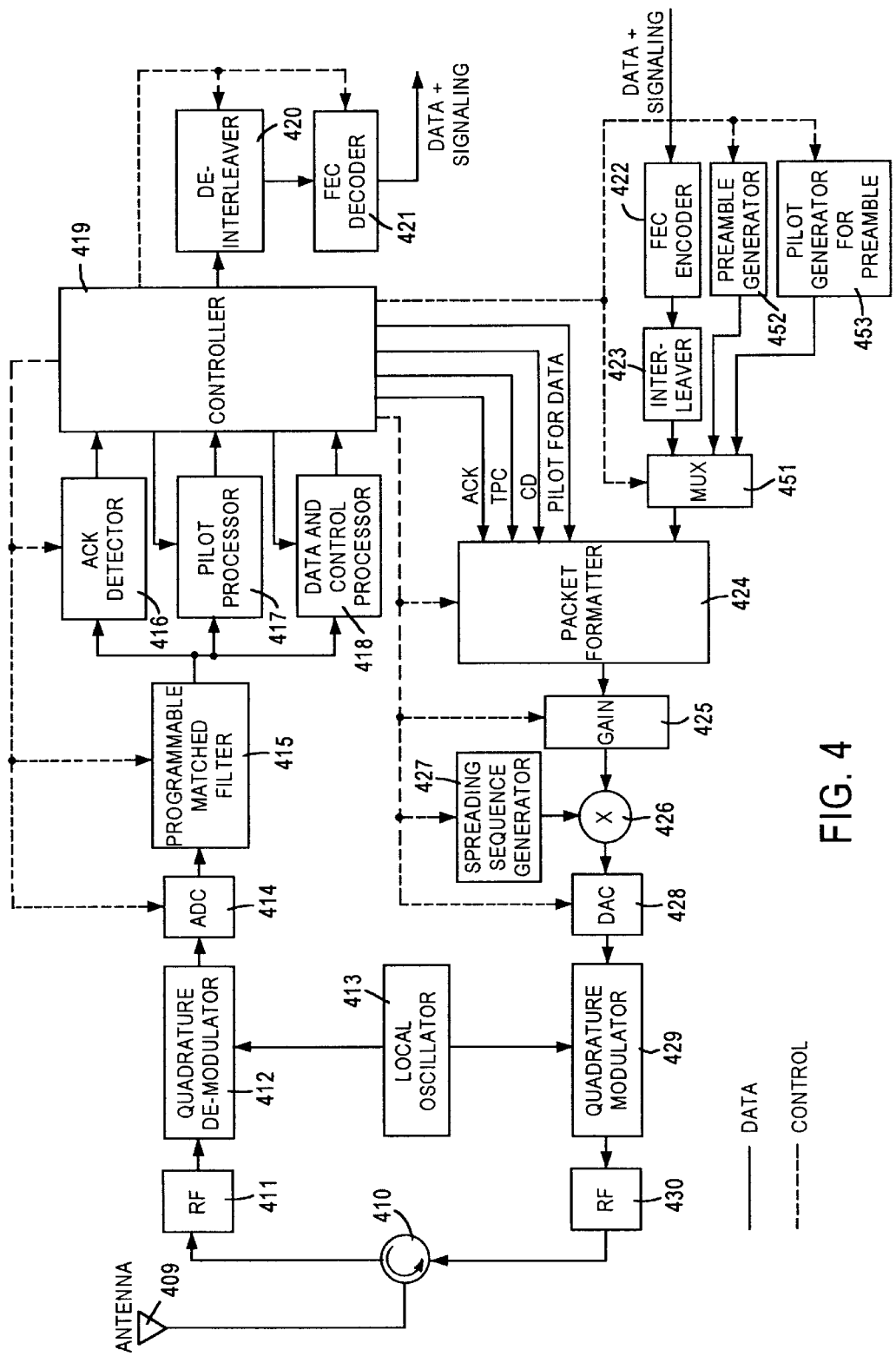
FIG. 4 is a block diagram of a mobile station receiver and transmitter for common packet channel.

In the illustrative embodiment shown in FIG. 4, a MS spread-spectrum transmitter and a MS spread-spectrum receiver are shown. The MS spread-spectrum transmitter and the MS spread-spectrum receiver are located at the mobile station 35, shown in FIG. 1. The MS spread-spectrum receiver includes an antenna 409 coupled to a circulator 410, a receiver radio frequency (RF) section 411, a local oscillator 413, a quadrature demodulator 412, and an analog-to-digital converter 414. The receiver RF section 411 is coupled between the circulator 410 and the quadrature demodulator 412. The quadrature demodulator is coupled to the local oscillator 413 and to the analog to digital converter 414. The output of the analog-to-digital converter 415 is coupled to a programmable-matched filter 415.

An acknowledgment detector 416, pilot processor 417 and data-and-control processor 418 are coupled to the programmable-matched filter 415. A controller 419 is coupled to the acknowledgment detector 416, pilot processor 417 and data-and-control processor 418. A de-interleaver 420 is coupled between the controller 419 and a forward-error-correction (FEC) decoder 421.

The MS spread-spectrum transmitter includes a forward-error-correction (FEC encoder 422 coupled to an interleaver 423. A packet formatter 425 is coupled through a multiplexer 424 to the interleaver 423 and to the controller 419. A preamble generator 452 and a pilot generator 453 for the preamble are coupled to the multiplexer 451. A variable gain device 425 is coupled between the packet formatter 424 and a product device 426. A spreading-sequence generator 427 is coupled to the product device 426. A digital-to-analog converter 428 is coupled between the product device 428 and quadrature modulator 429. The quadrature modulator 429 is coupled to the local oscillator 413 and a transmitter RF section 430. The transmitter RF section 430 is coupled to the circulator 410.

The controller 419 has control links coupled to the analog-to-digital converter 414, programmable-matched filter 415, acknowledgment detector 416, the digital-to-analog converter 428, the spreading sequence generator 427, the variable gain device 425, the packet formatter 424, the de-interleaver 420, the FEC decoder 421, the interleaver 423, the FEC encoder 422, the preamble generator 452 and the pilot generator 453.

A received spread-spectrum signal from antenna 409 passes through circulator 410 and is amplified and filtered by receiver RF section 411. The local oscillator 413 generates a local signal which quadrature demodulator 412 uses to demodulate in-phase and quadrature phase components of the received spread-spectrum signal. The analog-to-digital converter 414 converts the in-phase component and the quadrature-phase component to a digital signal. These functions are well known in the art, and variations to this block diagram can accomplish the same function.

The programmable-matched filter 415 despreads the received spread-spectrum signal. A correlator, as an alternative, may be used as an equivalent means for despreading the received spread-spectrum signal.

The acknowledgment detector 416 detects an acknowledgment in the received spread-spectrum signal. The pilot processor detects and synchronizes to the pilot portion of the received spread-spectrum signal. The data and control processor detects and processes the data portion of the received spread-spectrum signal. Detected data passes through the controller 419 to the de-interleaver 420 and FEC decoder 421. Data and signaling are outputted from the FEC decoder 421.

In the MS transmitter, data are FEC encoded by FEC encoder 422, and interleaved by interleaver 423. The preamble generator 452 generates a preamble and the pilot generator 453 generates a pilot for the preamble. The multiplexer 451 multiplexes the data, preamble and pilot, and the packet formatter 424 formats the preamble, pilot and data into a common-packet channel packet. Further, the packet formatter formats data, signaling, acknowledgment signal, collision detection signal, pilot signal and TPC signal into a packet. The packet is outputted from packet formatter, and the packet level is amplified or attenuated by variable gain device 425. The packet is spread-spectrum processed by product device 426, with s spreading chip-sequence from spreading-sequence generator 427. The packet is converted to an analog signal by digital-to-analog converter 428, and in-phase and quadrature-phase components are generated by quadrature modulator 429 using a signal from local oscillator 413.

Figure 5:
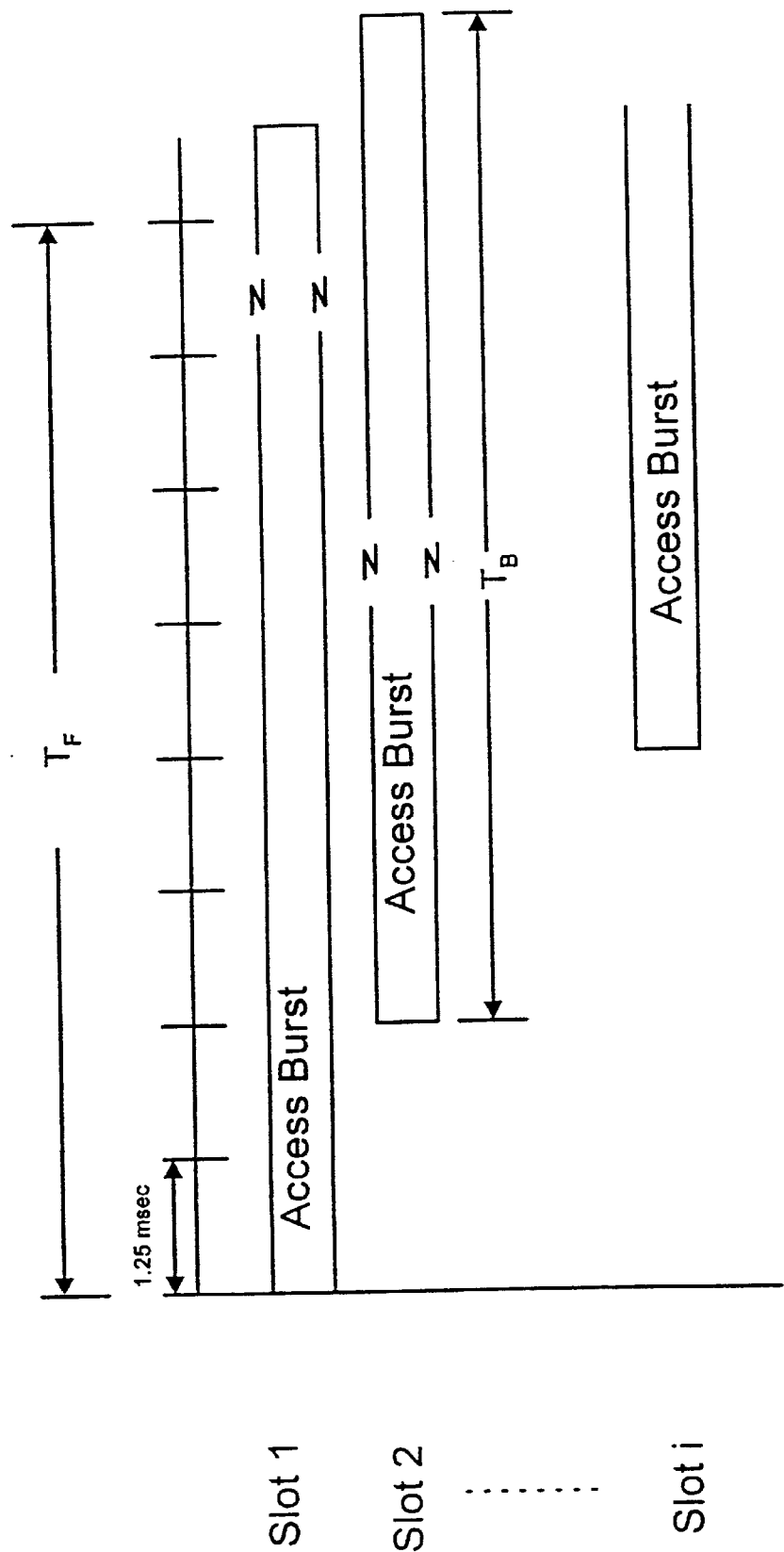
FIG. 5 is a timing diagram for access burst transmission.

Referring to FIG. 5, the base station transmits a common-synchronization channel, which has a frame time duration $T_F$. The common-synchronization channel has a common chip-sequence signal, which is common to the plurality of remote stations communicating with the particular base station. In a particular embodiment, the time $T_F$ of one frame is ten milliseconds. Within one frame, there are eight access slots. Each access slot lasts 1.25 milliseconds. Timing for the access slots is the frame timing, and the portion of the common-synchronization channel with the frame timing is denoted the frame-timing signal. The frame-timing signal is the timing a remote station uses in selecting an access slot in which to transmit an access-burst signal.

A first remote station attempting to access the base station, has a first RS-spread-spectrum receiver for receiving the common synchronization channel, broadcast from the base station. The first RS-spread-spectrum receiver determines frame timing from the frame-timing signal.

A first RS-spread-spectrum transmitter, located at the first remote station, transmits an access-burst signal. An access burst signal, as shown in FIG. 5, starts at the beginning of an access slot, as defined by the frame timing portion of the common-synchronization channel.

Figure 6:
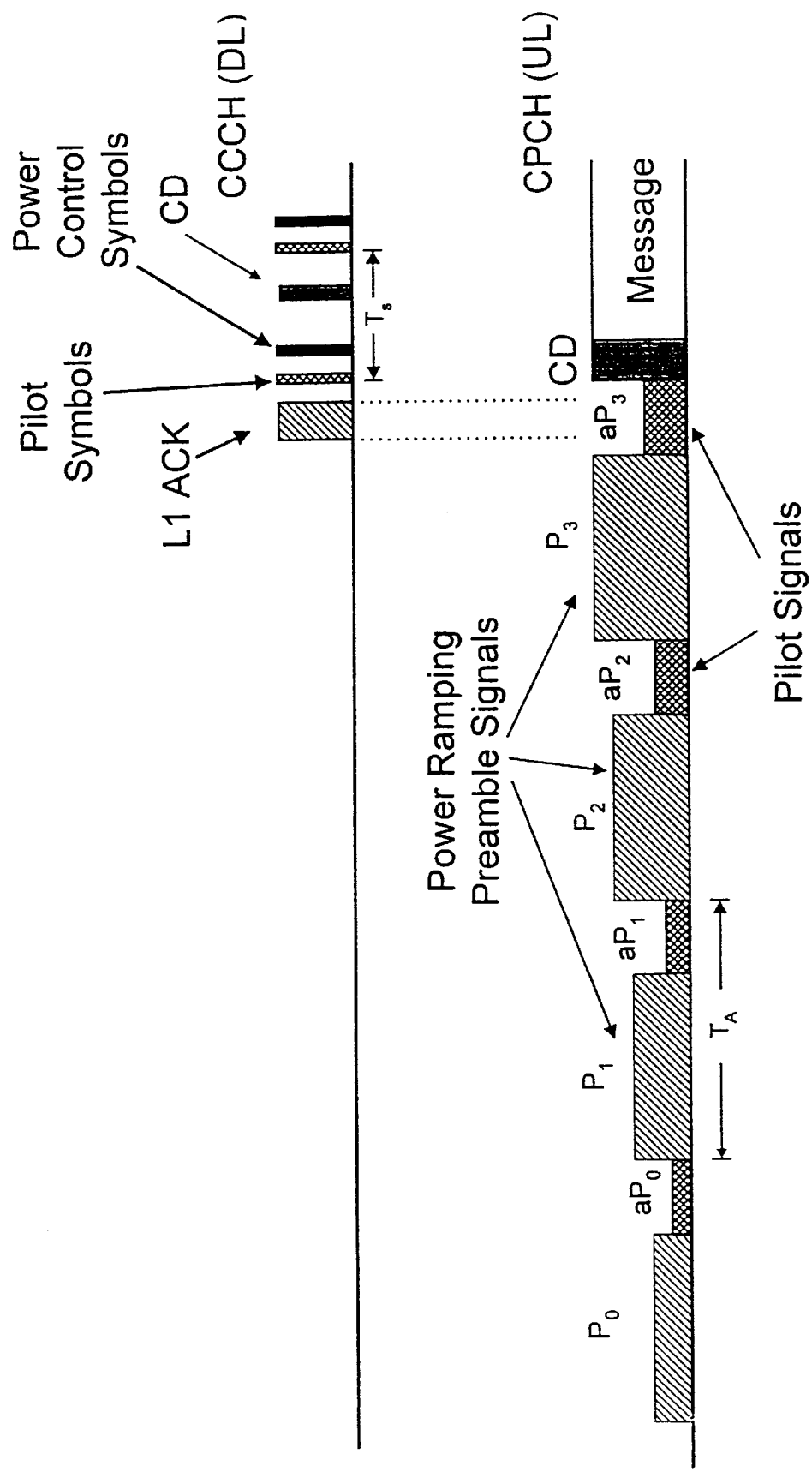
FIG. 6 illustrates common packet channel access burst of FIG. 5 using a common control downlink channel.
Figure 7:
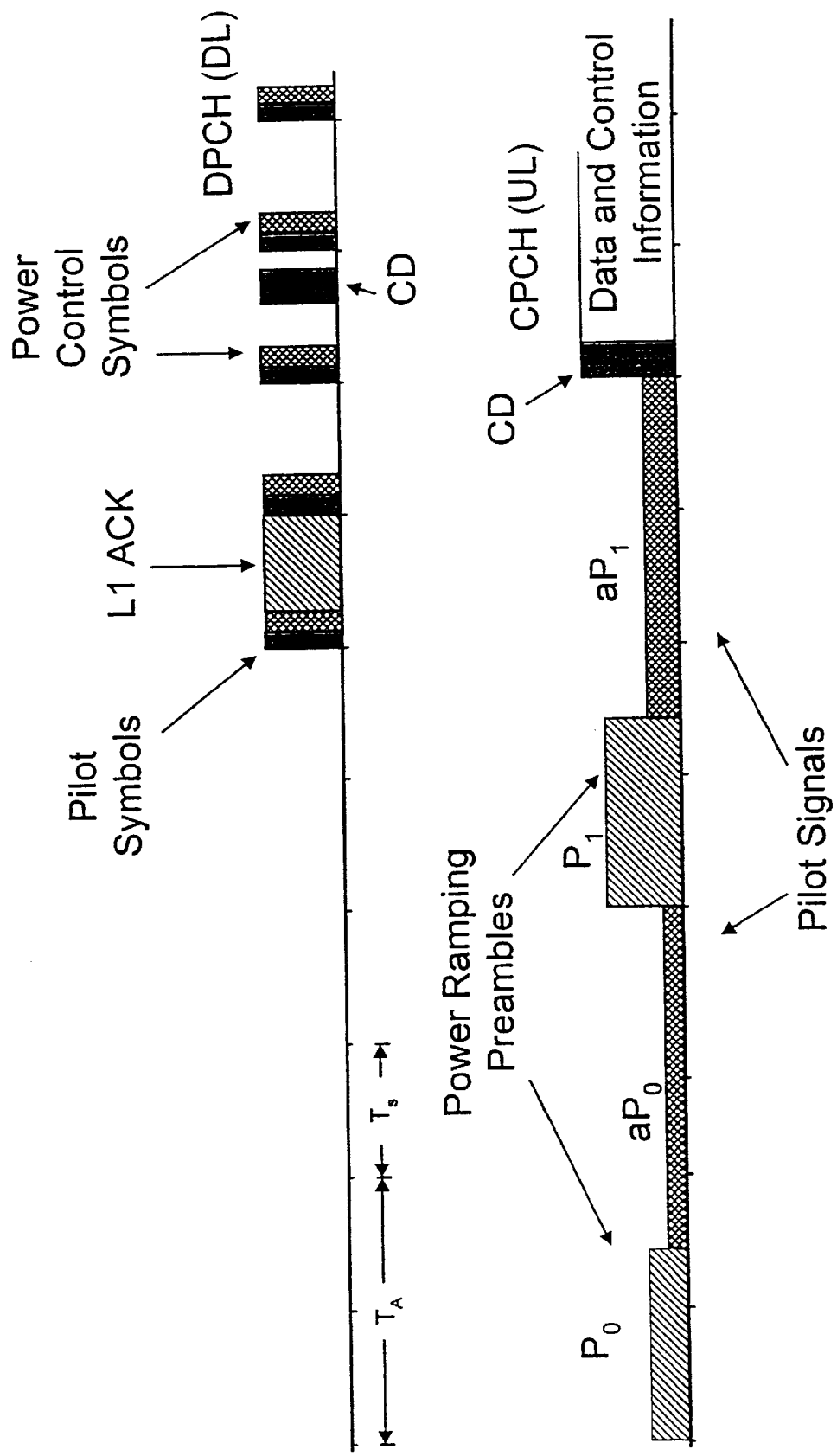
FIG. 7 illustrates common packet channel access of FIG. 5 using a dedicated downlink channel

FIG. 6 illustratively shows the common-packet channel access burst format, for each access-burst signal. Each access-burst signal has a plurality of segments. Each segment has a preamble followed by a pilot signal. The plurality of segments has a plurality of power levels, respectively. More particularly, the power level of each segment increases with each subsequent segment. Thus, a first segment has a first preamble and pilot, at a first power level $P_0$. A second segment has a second preamble and a second pilot, at a second power level $P_1$. The third segment has a third preamble and a third pilot at a third power level $P_2$. The first preamble, the second preamble, the third preamble, and subsequent preambles, may be identical or different. The power level of the pilot preferably is less than the power level of the preamble. A preamble is for synchronization, and a corresponding pilot, which follows a preamble, is to keep the BS spread-spectrum receiver receiving the spread-spectrum signal from the remote station, once a preamble is detected.

A subsequent increase or decrease of power levels is basically a closed loop power control system. Once a BS spread-spectrum receiver detects a preamble from the remote station, the BS spread-spectrum transmitter sends an acknowledgment (ACK) signal.

Figure 9A:
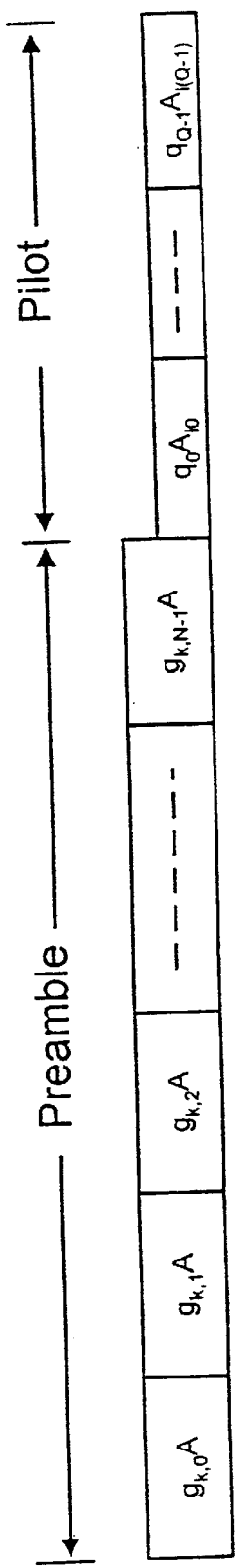
FIG. 9 illustrates preamble and pilot formats.
Figure 9B:
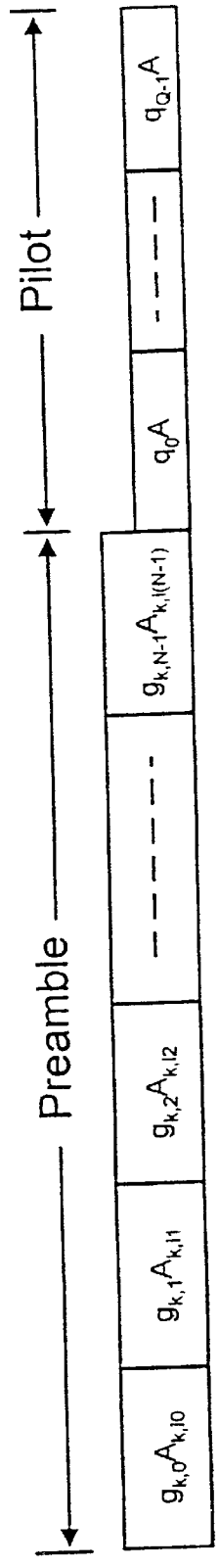

Referring to FIG. 4, the preamble is generated by preamble generator 452 and the pilot is generated by pilot generator 453. A preamble format is shown in FIG. 8. The preamble format with a pilot is shown in FIG. 9. The multiplexer 451, with timing from the controller 419, selects the preamble then a corresponding pilot, for packet formatter 424. A series of preambles and pilots may be generated and made as part of the packet by packet formatter 424. The preambles and pilots can have their power level adjusted either in the preamble generator 452 and pilot generator 453, or by the variable gain device 425.

The BS spread-spectrum receiver receives the access-burst signal at a detected-power level. More particularly, the access-burst signal has the plurality of preambles at a plurality of power levels, respectively. When a preamble with sufficient power level is detected at the BS spread-spectrum receiver, then an acknowledgment (ACK) signal is transmitted from the BS spread-spectrum transmitter. The ACK signal is shown in FIG. 6, in response to the fourth preamble having sufficient power for detection by the BS spread-spectrum receiver.

FIG. 3 shows the preamble processor 316 for detecting the preamble and the pilot processor 317 for continuing to receive the packet after detecting the preamble. Upon detecting the preamble, the processor 319 initiates an ACK signal which passes to packet formatter 324 and is radiated by the BS spread-spectrum transmitter.

The first RS-spread-spectrum receiver receives the acknowledgment signal. Upon receiving the ACK signal, the first RS-spread-spectrum transmitter transmits to the BS-spread-spectrum receiver, a spread-spectrum signal having data. The data is shown in FIG. 6, in time, after the ACK signal. The data may include a collision detection (DC) portion of the signal, referred to herein as a collision detection signal, and message.

Figure 10:
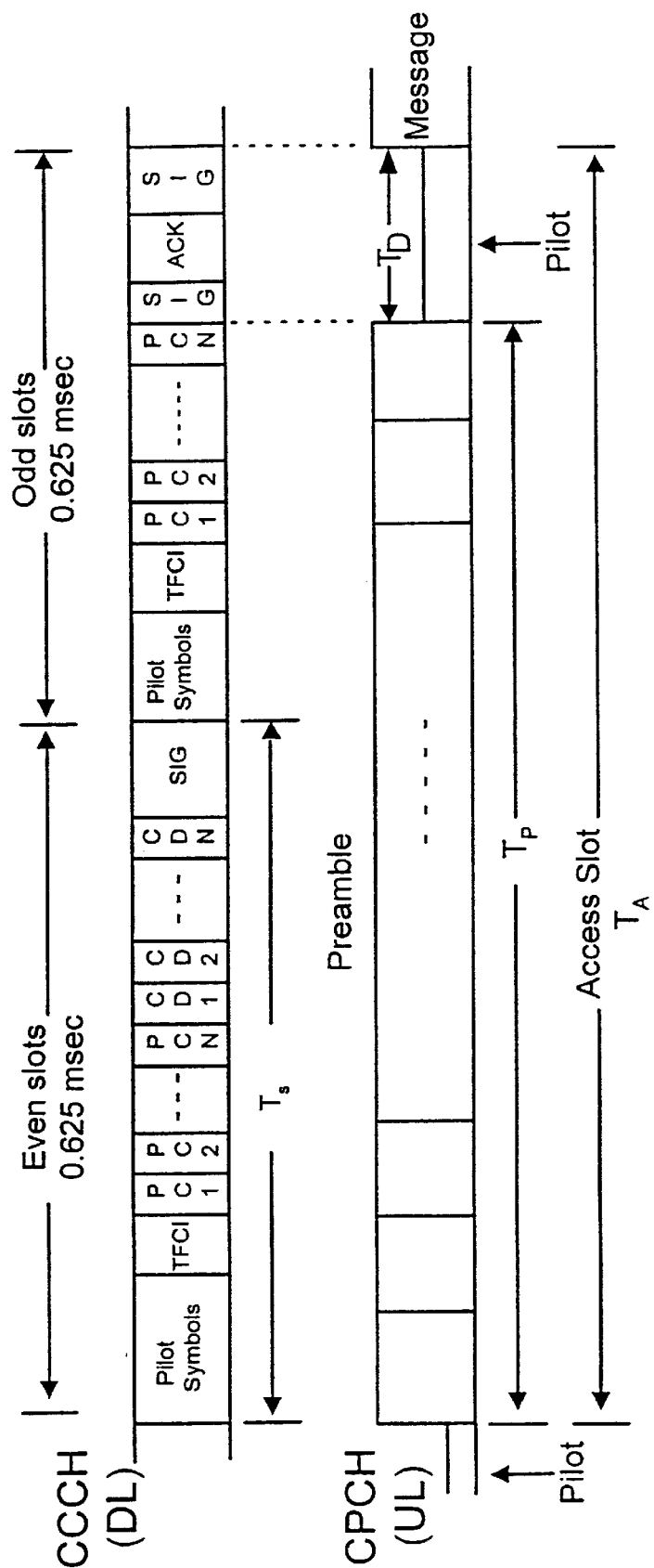
FIG. 10 is a common packet channel timing diagram and frame format of the down link common control link.
Figure 11:
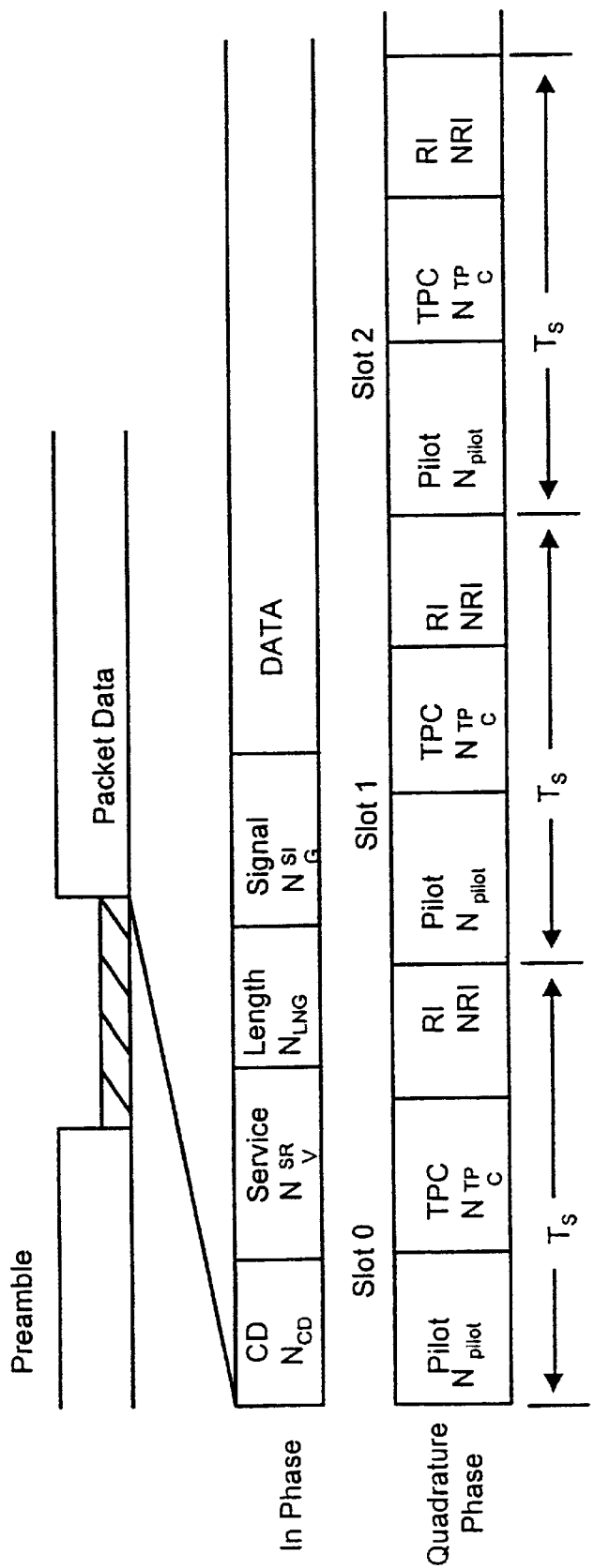
FIG. 11 illustrates frame format of common packet channel, packet data.

In response to each packet transmitted from the MS spread-spectrum transmitter, the BS receiver detects the collision detection portion of the data, and retransmits the data field of the collision detection portion of the data to the remote station. FIG. 10 shows the timing diagram for re-transmitting the collision detection field. There are several slots for collision detection retransmission, which can be used for re-transmitting the collision detection field for several remote stations. If the collision detection field were correctly re-transmitted to the remote station, then the remote station knows its packet is successfully received by the base station. If the collision detection field were not correctly re-transmitted by the base station, then the remote station assumes there is a collision with a packet transmitted by another remote station, and stops further transmission of the data. FIG. 11 shows a frame format of a common-packet channel data payload.

In operation, an overview of the way this transport mechanism is used is as follows. A remote station (RS) upon power up searches for transmission from nearby base stations. Upon successful synchronization with one or more base stations, the Remote station receives the necessary system parameters from a continuously transmitted by all base stations broadcast control channel (BCCH). Using the information transmitted from the BCCH, the remote station can determine various parameters required when first transmitting to a base station. Parameters of interest are the loading of all the base stations in the vicinity of the remote station, their antenna characteristics, spreading codes used to spread the downlink transmitted information, timing information and other control information. With this information, the remote station can transmit specific waveforms in order to capture the attention of a nearby base station. In the common packet channel the remote station, having all the necessary information from the nearby base station, it starts transmitting a particular preamble from a set of predefined preambles, at [a] well selected time intervals. The particular structure of the preamble waveforms is selected on the basis that detection of the preamble waveform at the base station is to be as easy as possible with minimal loss in detectability.

The physical common packet channel (CPCH) is used to carry the CPCH. It is based on the well known Slotted ALOHA approach. There is a number of well defined time offsets relative to the frame boundary of a downlink received BCCH channel. These time offsets define access slots. The number of access slots is chosen according to the particular application at hand. As an example, shown in FIG. 5, eight access slots are spaced 1.25 msec apart in a frame of 10-msec duration.

According to FIG. 5, a remote station picks an access slot in a random fashion and tries to obtain a connection with a base station by transmitting a preamble waveform. The base station is able to recognize this preamble, and is expecting its reception at the beginning of each access slot. The length of the access burst is variable and the length of the access burst is allowed to vary from a few access slots to many frame durations. The amount of data transmitted by the remote station could depend on various factors. Some of those are: class capability of the remote station, prioritization, the control information transmitted down by the base station, and various bandwidth management protocols residing and executed at the base station. A field at the beginning of the data portion signifies the length of the data.

The structure of the access burst is shown in FIG. 6. The access burst starts with a set of preambles of duration $T_P$ whose power is increased in time from preamble to preamble in a step-wise manner. The transmitted power during each preamble is constant. For the duration $T_D$ between preambles the access burst consists of a pilot signal transmitted at a fixed power level ratio relative to the previously transmitted preamble. There is a one to one correspondence between the code structure of the preamble and the pilot signal. The pilot signal could be eliminated by setting it to a zero power level.

The transmission of the preambles ceases if the preamble has been picked up detected by the base station and the base station has responded to the remote station with a layer one acknowledgment L1 ACK, which the remote station has also successfully received. Alternatively, transmission of the preamble ceases if the remote station has transmitted the maximum allowed number of preambles Mp without acknowledgement. Upon receiving an L1 ACK the remote station starts transmission of its data. Once the remote station has transmitted more than Mp preambles, it undergoes a forced random back off procedure. This procedure forces the remote station to delay its access burst transmission for a later time. The random back off procedure could be parameterized based on the priority statues of the Remote station. The amount by which the power is increased from preamble to preamble is Dp which is either fixed for all cells at all times or it is repeatedly broadcast via the BCCH. Remote stations with different priority statuses could use a power increase which depends on a priority status assigned to the remote station. The priority status could be either predetermined or assigned to the remote station after negotiation with the base station.

The Preamble Signal Structure

There is a large set of possible preamble waveforms. Every base station is assigned a subset of preambles from the set of all preamble waveforms in the system. The set of preambles a base station is using is broadcast through it's BCCH channel. There are many ways of generating preamble waveforms. One existing way is to use a single orthogonal Gold code per preamble from the set of all possible orthogonal Gold codes of length L. A preamble could then be constructed by repeating the Gold code a number of times N to transmit a length N complex sequence. For example if A denotes the orthogonal Gold-code and $G_i = \{g_{i,0}\ g_{i,1}\ g_{i,2}\ \ldots\ g_{i,N-1}\}$, a length N complex sequence, then a preamble could be formed as shown in FIG. 8, where, $g_{i,j}$, j=0, ..., N−1, multiplies every element in A. Normally the sets of $G_i$'s are chosen to be orthogonal to each other. This will allow for a maximum of N possible waveforms. The total number of possible preambles is then L*N.

The preferred approach is to use different codes rather than a single repeating code in generating each preamble. In that case, if L possible codes, not necessarily Gold Codes, were possible, designated by $A_0, A_1, \ldots A_{L-1}$, then possible preambles will be as shown in FIG. 8. The order of the $A_i$'s can be chosen so that identical codes are not used in the same locations for two different preambles. A similar approach could be used to form the pilot signals.

The Downlink Common Control Channel

In FIG. 10, the downlink common control channel structure for even and odd slots is shown. The even slots contain reference data and control data. The pilot symbols are used to derive a reference for demodulating the remaining control symbols. The control symbols are made of transport frame indicator (TFI) symbols, power control (PC) symbols, collision detection (CD) symbol and signaling symbols (SIG). The odd slots contain all the information that the even slots contain plus an acknowledgment (ACK) signal. Odd slots do not include collision detection fields.

The uplink CPCH is shown over the last transmitted preamble. After the last transmitted preamble, the base station has successfully detected the transmission of the last transmitted preamble and transmits back the acknowledgment signal. During the same time, the remote station is tuned to receive the ACK signal. The ACK signal transmitted corresponds to the specific preamble structure transmitted on the uplink. Once the remote station detects the ACK signal corresponding to transmitted preamble by the remote station, the remote station begins transmission of its data.

Corresponding with the preamble structure in the uplink there is a corresponding in time power control information symbol and a corresponding in time collision detection field. Upon start of data transmission the remote station uses the downlink transmitted power control information to adjust its transmitted power. The power control symbols are decoded to derive binary decision data, which is then used to increase or decrease the transmitted power accordingly. FIG. 11 shows the structure of the uplink frame and the slot format for the data portion of the uplink transmission. Data and control information is transmitted in an in-phase and quadrature-phase multiplexed format. That is, the data portion could be transmitted on the in-phase coordinate and the control portion on the quadrature-phase coordinate. The modulation for the data and control is BPSK. The control channel may contain the information for the receiver to enable the demodulation of the data. The control channel provides for upper layer system functionality. The data portion consists of one or more frames. Each frame consists of a number of slots. As an example the frame duration could be 10 milliseconds long and the slot duration 0.625 milliseconds long. In that case, there are 16 slots per frame. The beginning of the data payload contains a collision detection field used to relay information about the possibility of collision with other simultaneously transmitting remote stations. The collision detection field is read by the base station. The base station expects the presence of the collision detection field since it had provided an ACK signal at the last time slot.

The collision detection field includes a temporary identification (ID) number chosen at random by the mobile for the transmission of the current packet. The base station reads the collision detection field and reflects, or transmits back, the collision detection field on the downlink. If the collision detection field detected by the remote station matched the one just being transmitted by the same remote station, then the collision detection field is an identification that the transmission is being received correctly. The remote station then continues transmitting the remaining of the packet. In case the collision detection field has not been received correctly by the remote station, then the remote station considers the packet reception by the base station as erroneous and discontinues transmission of the remaining packet.

The function of the remaining fields are as follows. The Pilot field enables the demodulation of both the data and control bits. The transmitted power control (TPC) bits are used to control the power of a corresponding downlink channel, in case a down link channel directed to the same user is operational. If the downlink channel were not operational, then the TPC control bits can be used to relay additional pilot bits instead.

The Rate Information (RI) field is used to provide the transmitter with the ability to change its data rate without the necessity to explicitly negotiate the instantaneous data rate with the base station. The service field provides information of the particular service the data bits are to be used for. The length field specifies the time duration of the packet. The signal field can be used to provide additional control information as required.

Additional functionalities of the common packet channel are: (1) bandwidth management and (2) L2 acknowledgment mechanism.

The bandwidth management functionality is implemented via signaling information on the down link common control channel. There are three ways for incorporating this functionality. The first relies on changing the priority status of all uplink users, which currently are transmitting information using the CPCH. By this method all the users are remapping their priority status via a control signal sent at the downlink. When the priority of the CPCH users is lowered their ability to capture an uplink channel is lowered. Thus the amount of data sent on the uplink by the CPCH users is thus reduced. The other mechanism is for the base station to relay the maximum possible data rate the CPCH users are allowed to transmit. This prevents the CPCH users from transmitting at a rate which could possibly exceed the uplink system capacity and therefore take the cell down, i.e., disrupt the communication for all users currently connected to the base station. For the third method, the base station could provide a negative acknowledgment through the ACK signal. In this case, any remote station which is tuned to receive the ACK signal is prohibited from further transmission of an access-burst signal.

The L2 acknowledgment (L2 ACK) mechanism, which is different than the L1 ACK, is used by the base station to notify the remote station for the correctness of an uplink packet reception. The base station could either relay to the remote station which portions of the packet have being received correctly or which have being received incorrectly. There are many existing ways of implementing a particular protocol to relay this type of information. For example, the packet could be identified as consisting of a number of frames, with each frame consisting of a number of sub-frames. The frames are identified by a predetermined number. The sub-frames in each frame are also identified by a specific number. One way for the base to relay the information about the correctness of the packet is to identify all the frames and sub-frames that have been received correctly. Another way is to identify the frames and sub-frames that have been received in error. The way the base station could identify the correctness of a frame or sub-frame is by checking its cyclic residue code (CRC) field. Other more robust mechanisms for acknowledgment may be used.

CD Operation

There are many remote stations that might try to access the base station at the same time. There is a number of different preamble signals which a remote station can use for reaching the base station. Each remote station chooses at random one of the preamble signals to use for accessing the base station. The base station transmits a broadcast common synchronization channel. This broadcast common synchronization channel includes a frame timing signal. The remote stations extract the frame timing transmitted by the base station by receiving the broadcast common synchronization channel. The frame timing is used by the remote stations to derive a timing schedule by dividing the frame duration in a number of access slots. The remote stations are allowed to transmit their preambles only at the beginning of each access slot. The actual transmit times for different remote stations could be slightly different due to their different propagation delays. This defines an access protocol commonly known as the slotted ALOHA access protocol. Each remote station repeatedly transmits its preamble signal until the base station detects the preamble, acknowledges that the preamble is received, and the acknowledgment is correctly received by the remote station. There could be more than one remote station transmitting the same preamble signal in the same access slot. The base station cannot recognize if two or more remote stations were transmitting the same preamble in the same access slot. When the base station detects the transmission of a preamble signal, it transmits back an acknowledgment message. There is one acknowledgment message corresponding to each possible preamble signal. Therefore, the are as many acknowledgment messages as there are preamble signals. Every transmitting remote station which receives an acknowledgment message corresponding to its transmitting preamble signal, will start transmitting its message. For each preamble signal, there is a corresponding spreading code used by the base station to transmit the message. The message transmission always starts at the beginning of an access slot. Since there could be a number of remote stations using the same preamble signal in the same access slot, they start transmitting their message at the same time using the same spreading code. In that case, the transmissions of the remote stations likely interferes with each other and thus is not received correctly.

Each remote station includes a collision detection (CD) field in the beginning of the transmitted message. The CD field is chosen at random by each remote station and independently from each other Remote Station. There is a predefined limited number of CD fields. Two remote stations transmitting their message at the same time most likely chose a different CD field. When the base station receives the CD field, the base station reflects back, transmits back, the CD field to the remote station. The remote station reads the reflected CD field by the base station. If the reflected CD field matched the the CD field the remote station transmitted, the the remote station assumes that the remote station is being received correctly by the base station and continue transmitting the rest of the message, or data. If the reflected CD field from the base station did not match the one transmitted by the remote station, then the remote station assumes that there has been a collision and stops transmitting the remaining message or data.

It will be apparent to those skilled in the art that various modifications can be made to the collision detection system of the instant invention without departing from the scope or spirit of the invention, and it is intended that the present invention cover modifications and variations of the collision detection system provided they come within the scope of the appended claims and their equivalents.

We claim:

1. An improvement to a code-division-multiple-access (CDMA) system employing spread-spectrum modulation, with the CDMA system having a first base station (BS) with a first BS-spread-spectrum transmitter and a first BS-spread-spectrum receiver, a second base station with a second BS-spread-spectrum transmitter and a second BS-spread-spectrum receiver, and a plurality of remote stations, with each remote station (RS) having an RS-spread-spectrum transmitter and an RS-spread-spectrum receiver, the method comprising the steps of:

transmitting from said first BS-spread-spectrum transmitter located at said first base station, a first broadcast common-synchronization channel having a first common chip-sequence signal common to the plurality of remote stations, the first broadcast common-synchronization channel having a first frame-timing signal;

transmitting from said second BS-spread-spectrum transmitter located at said second base station, a second broadcast common-synchronization channel having a second common chip-sequence signal common to the plurality of remote stations, the second broadcast common-synchronization channel having a second frame-timing signal;

receiving at a first RS-spread-spectrum receiver the first broadcast common-synchronization channel, and determining a first frame timing at said first RS-spread-spectrum receiver from the first frame-timing signal;

receiving at the first RS-spread-spectrum receiver the second broadcast common-synchronization channel, and determining a second frame timing at said first RS-spread-spectrum receiver from the second frame-timing signal;

determining, based on any of power levels and probabilities of error, at said first RS-spread-spectrum receiver, from the first broadcast common-synchronization channel and from the second broadcast common-synchronization channel, to transmit to said first base station;

transmitting from a first RS-spread-spectrum transmitter to said first base station, a first access-burst signal;

receiving at said first BS-spread-spectrum receiver the first access-burst signal at a first detected-power level;

transmitting from said first BS-spread-spectrum transmitter to said first RS-spread-spectrum receiver, responsive to the first access-burst signal, a first acknowledgment signal;

receiving at said first RS-spread-spectrum receiver the first acknowledgment signal; and transmitting from said first RS-spread-spectrum transmitter, responsive to the first acknowledgment signal, to said first BS-spread-spectrum receiver, a first spread-spectrum signal having data.

2. The improvement as set forth in claim 1, further including the step of transmitting from said first RS-spread-spectrum transmitter, any of data and control information, to said BS-spread-spectrum receiver.

3. The improvement as set forth in claim 1 with the step of transmitting from the first RS-spread-spectrum transmitter the first access-burst signal, including the step of transmitting the first access-burst signal with a first plurality of segments having a first plurality of power levels increasing sequentially, respectively.

4. The improvement as set forth in claim 1, further including the steps of:

determining, based on any of power levels and probabilities of error, at said first RS-spread-spectrum receiver, from the first broadcast common-synchronization channel and from the second broadcast common-synchronization channel, to transmit to said second base station;

transmitting from the first RS-spread-spectrum transmitter to said second base station, a second access-burst signal;

receiving at said second BS-spread-spectrum receiver the second access-burst signal at a second detected-power level;

transmitting from said second BS-spread-spectrum transmitter to said first RS-spread-spectrum receiver, responsive to the second access-burst signal, a second acknowledgment signal;

receiving at said first RS-spread-spectrum receiver the second acknowledgment signal; and transmitting from said first RS-spread-spectrum transmitter, responsive to the second acknowledgment signal, to said second BS-spread-spectrum receiver, a second spread-spectrum signal having data.

5. The improvement as set forth in claim 4, further including the step of transmitting from said second RS-spread-spectrum transmitter, any of data and control information, to said BS-spread-spectrum receiver.

6. The improvement as set forth in claim 4 with the step of transmitting from the first RS-spread-spectrum transmitter the second access-burst signal, including the step of transmitting the second access-burst signal with a second plurality of segments having a second plurality of power levels increasing sequentially, respectively.

7. An improvement to a code-division-multiple-access (CDMA) system employing spread-spectrum modulation, with the CDMA system having a first base station (BS), a second base station, and a plurality of remote stations (RS) with each remote station having an RS-spread-spectrum transmitter and an RS-spread-spectrum receiver, the improvement comprising:

a first BS-spread-spectrum transmitter located at said first base station, for transmitting a first broadcast common-synchronization channel having a first common chip-sequence signal common to the plurality of remote stations, the first broadcast common-synchronization channel having a first frame-timing signal;

a second BS-spread-spectrum transmitter located at said second base station, for transmitting a second broadcast common-synchronization channel having a second common chip-sequence signal common to the plurality of remote stations, the second broadcast common-synchronization channel having a second frame-timing signal;

a first RS-spread-spectrum receiver, located at a first remote station of the plurality of remote stations, for receiving the first broadcast common-synchronization channel, and determining first frame timing at said first RS-spread-spectrum receiver from the first frame-timing signal;

said first RS-spread-spectrum receiver for receiving the second broadcast common-synchronization channel, and determining a second frame timing at said first RS-spread-spectrum receiver from the second frame-timing signal;

means, based on any of power levels and probabilities of error, located at said first RS-spread-spectrum receiver, for determining from the first broadcast common-synchronization channel and from the second broadcast common-synchronization channel, to transmit to said first base station;

a first RS-spread-spectrum transmitter, located at said first remote station of said plurality of remote stations, for transmitting a first access-burst signal;

said first BS-spread-spectrum receiver for receiving the access-burst signal at a detected-power level;

said first BS-spread-spectrum transmitter for transmitting to said first RS-spread-spectrum receiver, responsive to receiving the first access-burst signal, a first acknowledgment signal;

said first RS-spread-spectrum receiver for receiving the first acknowledgment signal; and said first RS-spread-spectrum transmitter, responsive to the first acknowledgment signal, for transmitting to said first BS-spread-spectrum receiver, a first spread-spectrum signal having data.

8. The improvement as set forth in claim 7, with said first RS-spread-spectrum transmitter for transmitting any of data and control information, to said BS-spread-spectrum receiver.

9. The improvement as set forth in claim 8 with said first RS-spread-spectrum transmitter for transmitting the first access-burst signal with a first plurality of segments having a first plurality of power levels increasing sequentially, respectively.

10. The improvement as set forth in claim 7, further including:

said means for determining, based on any of power levels and probabilities of error, at said first RS-spread-spectrum receiver, from the first broadcast common-synchronization channel and from the second broadcast common-synchronization channel, to transmit to said second base station;

said first RS-spread-spectrum transmitter for transmitting to said second base station, a second access-burst signal;

said second BS-spread-spectrum receiver for receiving the second access-burst signal at a second detected-power level;

said second BS-spread-spectrum transmitter for transmitting to said first RS-spread-spectrum receiver, responsive to the second access-burst signal, a second acknowledgment signal;

said first RS-spread-spectrum receiver for receiving the second acknowledgment signal; and said first RS-spread-spectrum transmitter, responsive to the second acknowledgment signal, for transmitting to said second BS-spread-spectrum receiver, a second spread-spectrum signal having data.

11. The improvement as set forth in claim 10 with said first RS-spread-spectrum transmitter for transmitting the second access-burst signal with a second plurality of segments having a second plurality of power levels increasing sequentially, respectively.

12. The improvement as set forth in claim 10, with said second RS-spread-spectrum transmitter for transmitting any of data and control information, to said BS-spread-spectrum receiver.

13. A base-band processor, for use in a code-division-multiple-access (CDMA) wireless base station having a modulator and a demodulator, the base-band processor comprising:

a preamble processor, coupled to the demodulator, for detecting a preamble in a received spread-spectrum signal;

a data processor, coupled to the demodulator, for detecting and processing any data contained in the received spread-spectrum signal;

an encoder, for encoding data;

an interleaver, coupled to the encoder, for interleaving encoded data;

packet a packet formatter, coupled to the interleaver, for formatting the interleaved data into a packet; and a controller coupled to the preamble processor and coupled for controlling the modulator, the data processor and the packet formatter, such that in operation the base-band processor is for performing the following steps:

detecting a first one of a sequence of coded preamble signals embedded in a first spread-spectrum signal received at an adequate power level;

upon detection of the first coded preamble signal at the adequate power level, generating a packet comprising an acknowledgement signal, and outputting the packet comprising the acknowledgement signal to the modulator; and processing a packet, comprising data, from a second received spread-spectrum signal.

14. The base-band processor as set forth in claim 13, wherein:
the base-band processor further comprises the demodulator of the CDMA wireless base station; and
the demodulator is for demodulating a received spread-spectrum signal.

15. The base-band processor as set forth in claim 14, wherein the demodulator comprises:
an analog-to-digital converter for converting received spread-spectrum signals from an antenna to a digital signal; and
means responsive to the digital signal from the analog-to-digital converter for despreading the received spread-spectrum signals and detecting the transmitted data.

16. The base-band processor as set forth in claim 13, further comprising a digital to analog converter responsive to digital signals from the packet formatter.

17. The base-band processor as set forth in claim 13, further comprising a variable gain device, coupled to the packet formatter, for adjusting the level of packets from the packet formatter before application thereof to the modulator.

18. A base-band processor, for use in a code-division-multiple-access (CDMA) wireless handset having a spread-spectrum modulator and a spread-spectrum demodulator, the base-band processor, comprising:
an acknowledgment detector, coupled to the demodulator, for detecting an acknowledgment in a received spread-spectrum signal;
an encoder, for encoding data;
an interleaver, coupled to the encoder, for interleaving encoded data;
a preamble generator for generating a preamble;
a multiplexer, coupled to the interleaver and to the preamble generator, for multiplexing the interleaved data and the preamble;
a packet formatter, coupled to the multiplexer, for formatting the multiplexed data and preamble into one or more packets; and
a controller coupled to the acknowledgment detector and coupled for controlling the modulator, the preamble generator, the multiplexer and the packet formatter, such that in operation the base-band processor is for performing the following steps:
generating and outputting to the modulator a plurality of packets comprising a sequence of coded preamble signals at sequentially increasing discrete power levels;
detecting an acknowledgement in a received spread-spectrum signal; and
upon detection of the acknowledgement, outputting a packet comprising data to the modulator for transmission over a random access wireless channel.

19. The base-band processor as set forth in claim 18, wherein:
the base-band processor further comprises the demodulator of the CDMA wireless handset; and
the demodulator is for demodulating a received spread-spectrum signal.

20. The base-band processor as set forth in claim 19, wherein the demodulator comprises:
an analog-to-digital converter for converting received spread-spectrum signals from an antenna to a digital signal; and
means responsive to the digital signal from the analog-to-digital converter for despreading the received spread-spectrum signals and detecting transmitted data.

21. The base-band processor as set forth in claim 18, further comprising a digital to analog converter responsive to digital signals from the packet formatter.

22. The base-band processor as set forth in claim 18, further comprising a variable gain device, coupled to the packet formatter, for adjusting the level of packets from the packet formatter before application thereof to the modulator.

23. A method of operation of a code-division-multiple-access (CDMA) system employing spread-spectrum modulation, with the CDMA system having a base station (BS) with a BS-spread-spectrum transmitter and a BS-spread-spectrum receiver, and a plurality of remote stations, with each remote station (RS) having an RS-spread spectrum transmitter and an RS-spread-spectrum receiver, the method comprising the steps of:
transmitting a broadcast common-synchronization channel, from the BS-spread-spectrum transmitter located at the base station to the plurality of remote stations;
receiving at a first RS-spread-spectrum receiver the broadcast common-synchronization channel, and determining a plurality of parameters required for transmission to the base station;
transmitting from a first RS-spread-spectrum transmitter a first preamble at a first discrete power level;
if no acknowledgment corresponding to the previously transmitted preamble is received at the first RS-spread-spectrum receiver by a time following the transmission of the first preamble, transmitting from the first RS-spread-spectrum transmitter a second preamble at a second discrete power level that is higher than the first discrete power level;
receiving the second preamble, at a detected-power level, at the BS-spread-spectrum receiver;
transmitting an acknowledgment of the received preamble from the BS-spread-spectrum transmitter;
receiving the acknowledgment at the first RS-spread-spectrum receiver; and
transmitting a spread-spectrum signal having data from the first RS-spread spectrum transmitter to the BS-spread-spectrum receiver, responsive to the receipt of the acknowledgment.

24. A method of communication through a code-division-multiple-access (CDMA) system employing spread-spectrum modulation, with the CDMA system having a base station (BS) with a BS-spread-spectrum transmitter and a BS-spread-spectrum receiver, and a plurality of remote stations, with each remote station (RS) having an RS-spread spectrum transmitter and an RS-spread-spectrum receiver, the method comprising the steps of:
receiving a broadcast common-synchronization channel from the BS-spread-spectrum transmitter located at the RS-spread-spectrum receiver of one of the remote stations, and determining a plurality of parameters required for transmission to the base station;
transmitting a preamble at a discrete power level from the RS-spread-spectrum transmitter of the one remote station;
listening for an acknowledgment corresponding to the transmitted preamble at the RS-spread-spectrum receiver of the one remote station;
if an acknowledgment is not received, upon expiration of a predetermined interval, following the transmission of the preamble, increasing power level to a new discrete power level, and repeating the transmitting step and continuing the listening step;

upon receiving an acknowledgment at the RS-spread-spectrum receiver of the one remote station, ceasing preamble transmission and transmitting a spread-spectrum signal having data from the RS-spread-spectrum transmitter of the one remote station, for the BS-spread-spectrum receiver.

25. The method of claim 24, wherein:

the steps of transmitting the preamble and listening for the acknowledgement repeat up to a maximum number of times; and if no acknowledgment corresponding to the transmitted preamble has been received after the maximum number of repetitions, the one remote station ceases preamble transmission for a period, before resuming the steps of transmitting the preamble and listening for the acknowledgement.

26. The method of claim 24, wherein if the steps of transmitting the preamble and listening for the acknowledgement repeat a plurality of times, the increasing of the power level to a new discrete power level will repeat until power level reaches a maximum value.

27. A method of transferring packet data for a mobile station (MS) with an MS receiver and an MS transmitter, comprising:

receiving at the MS receiver a broadcast common channel from a base station;

determining a plurality of parameters required for transmission to the base station;

spreading an access preamble selected from a set of predefined preambles;

transmitting from the MS transmitter the spread access preamble, at a first discrete power level;

if NO acknowledgement corresponding to the access preamble is detected, transmitting a spread access preamble from the MS transmitter at a second discrete power level higher than the first discrete power level; and upon detecting an acknowledgement corresponding to a transmitted access preamble, ceasing preamble transmission and transmitting the packet data from the MS transmitter.

28. The method of claim 27, further comprising one or more additional steps of transmitting a spread access preamble at a successively higher power if NO acknowledgement corresponding to any of the preamble transmissions is received, up to a maximum allowed number of preamble transmissions.

29. A code-division-multiple-access (CDMA) wireless handset, comprising:

a CDMA transmitter;

a CDMA receiver; and a controller coupled to the CDMA receiver for responding to signals received via the CDMA receiver and coupled for controlling the CDMA transmitter, such that in operation the CDMA handset is for performing the following steps:

spreading an access preamble selected from a set of predefined preambles;

transmitting the spread access preamble, at a first discrete power level to a base station;

if NO acknowledgement corresponding to the access preamble is detected, transmitting a spread access preamble from the MS transmitter at a second discrete power level higher than the first discrete power level; and upon detecting an acknowledgement corresponding to a transmitted access preamble, ceasing preamble transmission and transmitting packet data from the MS transmitter.

\* \* \* \* \*

(12) EX PARTE REEXAMINATION CERTIFICATE (7241st)
United States Patent
Kanterakis et al.

(10) Number: US 6,574,267 C1
(45) Certificate Issued: Dec. 15, 2009

(54) RACH-RAMP-UP ACKNOWLEDGEMENT

(75) Inventors: Emmanuel Kanterakis, North Brunswick, NJ (US); Kourosh Parsa, Riverside, CT (US)

(73) Assignee: Golden Bridge Technology, Inc., West Long Branch, NJ (US)

Reexamination Request:
No. 90/007,767, Oct. 20, 2005
No. 90/008,291, Nov. 14, 2006

Reexamination Certificate for:
Patent No.: 6,574,267
Issued: Jun. 3, 2003
Appl. No.: 09/273,450
Filed: Mar. 22, 1999

(51) Int. Cl.
*H04B 1/707* (2006.01)
*H04B 7/26* (2006.01)

(52) U.S. Cl. .................. 375/141; 370/342; 375/E1.003
(58) Field of Classification Search ........................ None
See application file for complete search history.

(56) References Cited

U.S. PATENT DOCUMENTS

| | | | |
|---|---|---|---|
| 4,689,786 A | 8/1987 | Sidhu et al. |
| 5,103,459 A | 4/1992 | Gilhousen |
| 5,280,472 A | 1/1994 | Gilhousen et al. |
| 5,295,152 A | 3/1994 | Gudmundson et al. |
| 5,305,308 A | 4/1994 | English et al. |

(Continued)

FOREIGN PATENT DOCUMENTS

| | | |
|---|---|---|
| EP | 0731576 | 9/1996 |
| EP | 0773636 | 5/1997 |
| GB | 2318258 | 4/1998 |

(Continued)

OTHER PUBLICATIONS

"Nokia looks back at 25 million CDMA handsets and sets course for the future", Nokia Inc, Mar. 11, 2003.*
*Golden Bridge Technology, Inc.* v. *Nokia, Inc., and Lucent Technologies, Inc.*, Report and Recommendation of United States Magistrate Judge, Civial Action No. 2:05cv151.
Plaintiff of Golden Bridge Technology, Inc.'s Reply Brief Regarding Claim Construction, filed on Mar. 8, 2008. U.S.D. CT., E.D. TX, Marshall Div., CA No. 2–05CV–151–LED.

(Continued)

*Primary Examiner*—Charles Craver

(57) ABSTRACT

An improvement to a code-division-multiple-access (CDMA) system employing spread-spectrum modulation, with the CDMA system having a base station (BS) with a BS-spread-spectrum transmitter and a BS-spread-spectrum receiver, and a plurality of remote stations. Each remote station (RS) has an RS-spread-spectrum transmitter and an RS-spread-spectrum receiver. The improvement includes the steps of transmitting from the BS-spread-spectrum transmitter, a broadcast common-synchronization channel. The broadcast common-synchronization channel has a common chip-sequence signal common to the plurality of remote stations, and a frame-timing signal. The improvement includes receiving at a first RS-spread-spectrum receiver the broadcast common-synchronization channel, and determining frame timing from the frame-timing signal, and transmitting from a first RS-spread-spectrum transmitter an access-burst signal. The access-burst signal has a plurality of segments, which have a plurality of power levels. At the BS-spread-spectrum receiver the access-burst signal is received at a detected-power level. In response to receiving the access-burst signal, the BS-spread-spectrum transmitter transmits to the first RS-spread-spectrum receiver an acknowledgment signal. The first RS-spread-spectrum receiver receives the acknowledgment signal, and in response to receiving the acknowledgment signal, the first RS-spread-spectrum transmitter transmits to the BS-spread-spectrum receiver, a spread-spectrum signal having data.

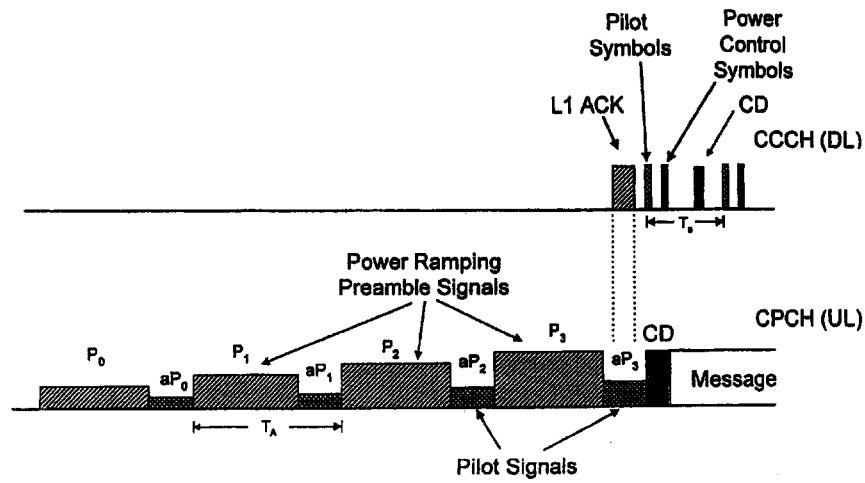

U.S. PATENT DOCUMENTS

| | | | |
|---|---|---|---|
| 5,329,550 | A | 7/1994 | Rousseau et al. |
| 5,384,777 | A | 1/1995 | Ahmadi et al. |
| 5,430,760 | A | 7/1995 | Dent |
| 5,461,639 | A | 10/1995 | Wheatley, III et al. |
| 5,491,837 | A | 2/1996 | Haartsen |
| 5,535,210 | A | 7/1996 | Smolinske et al. |
| 5,537,397 | A | 7/1996 | Abramson |
| 5,544,196 | A | 8/1996 | Tiedemann, Jr. et al. |
| 5,553,210 | A | 9/1996 | Narayanaswami |
| 5,673,259 | A | 9/1997 | Quick, Jr. |
| 5,752,172 | A | 5/1998 | Matero |
| 5,802,465 | A | 9/1998 | Hamalainen et al. |
| 5,806,003 | A | 9/1998 | Jolma et al. |
| 5,809,430 | A | 9/1998 | D'Amico |
| 5,822,311 | A | 10/1998 | Hassan et al. |
| 5,825,835 | A | 10/1998 | Kingston et al. |
| 5,828,662 | A | 10/1998 | Jalali et al. |
| 5,841,768 | A | 11/1998 | Ozluturk et al. |
| 5,850,392 | A | 12/1998 | Wang et al. |
| 5,850,602 | A | 12/1998 | Tisdale et al. |
| 5,875,182 | A | 2/1999 | Hatzipapafotiou |
| 5,893,036 | A | 4/1999 | Trandai et al. |
| 5,894,472 | A | 4/1999 | De Seze |
| 5,933,777 | A | 8/1999 | Rahman |
| 5,943,327 | A | 8/1999 | Mademann |
| 5,953,369 | A | 9/1999 | Suzuki |
| 5,982,763 | A | 11/1999 | Sato |
| 5,991,308 | A | 11/1999 | Fuhrmann et al. |
| 6,009,089 | A | 12/1999 | Huang et al. |
| 6,011,788 | A | 1/2000 | Hurst et al. |
| 6,021,122 | A | 2/2000 | Tiedemann, Jr. |
| 6,026,081 | A | 2/2000 | Hamabe |
| 6,031,832 | A | 2/2000 | Turina |
| 6,038,223 | A | 3/2000 | Hansson et al. |
| 6,038,250 | A | 3/2000 | Shou et al. |
| 6,091,757 | A | 7/2000 | Cudak et al. |
| 6,094,576 | A | 7/2000 | Hakkinen et al. |
| 6,141,337 | A | 10/2000 | Uta et al. |
| 6,141,373 | A | 10/2000 | Scott |
| 6,144,841 | A | 11/2000 | Feeney |
| 6,163,533 | A | 12/2000 | Esmailzadeh et al. |
| 6,169,759 | B1 | 1/2001 | Kanterakis et al. |
| 6,181,683 | B1 | 1/2001 | Chevillat et al. |
| 6,181,949 | B1 | 1/2001 | Ozluturk et al. |
| 6,256,301 | B1 | 7/2001 | Tiedemann, Jr. et al. |
| 6,259,724 | B1 | 7/2001 | Esmailzadeh |
| 6,301,286 | B1 | 10/2001 | Kanterakis et al. |
| 6,307,844 | B1 * | 10/2001 | Tsunehara et al. .......... 370/318 |
| 6,381,229 | B1 | 4/2002 | Narvinger et al. |
| 6,442,153 | B1 | 8/2002 | Dahlman et al. |
| 6,535,736 | B1 | 3/2003 | Balogh et al. |
| 6,574,267 | B1 | 6/2003 | Kanterakis et al. |
| 6,587,672 | B1 | 7/2003 | Chuah et al. |
| 6,597,675 | B1 | 7/2003 | Esmailzadeh et al. |
| 6,606,313 | B1 | 8/2003 | Dahlman et al. |
| 6,615,050 | B1 | 9/2003 | Tiedemann, Jr. et al. |
| 6,757,293 | B1 | 6/2004 | Chuah et al. |
| 6,775,548 | B1 | 8/2004 | Rong et al. |
| 2003/0114113 | A1 | 6/2003 | Komprobst |
| 2003/0223476 | A1 | 12/2003 | Kanterakis et al. |

FOREIGN PATENT DOCUMENTS

| | | |
|---|---|---|
| JP | 2-256331 | 10/1990 |
| JP | 9-233051 | 5/1997 |
| JP | 9-214467 | 8/1997 |
| WO | WO93/18601 | 9/1993 |
| WO | WO93/21692 | 10/1993 |
| WO | WO97/00568 | 1/1997 |
| WO | WO97/29596 | 8/1997 |
| WO | WO00/14989 | 3/2000 |

OTHER PUBLICATIONS

Decision dated May 21, 2008 from the U.S. Court Appeals for the Federal Circuit, *Golden Bridge Technology, Inc. v. Nokia, Inc. and Lucent Technologies, Inc.*, Appeal from the United States District Court for the Eastern District of Texas in Case No. 2:05–CV–151, 2007–1215.

Plaintiff–Appellant's Unopposed Motion to Dismiss Nokia, Inc. as a Party filed on Jan. 14, 2008, with the United States Court of Appeals for the Federal Circuit, Appeal No. 2007–1215.

Brief of Defendant–Appellee Lucent Technologies, Inc. filed on Oct. 3, 2007, with the United States Court of Appeals for the Circuit Court, Appeal No. 2007–1215.

Brief for Plaintiff–Appellant filed on Jul. 23, 2007, with the United States Court of Appeals for the Federal Circuit , Appeal No. 2007–1215.

Reply Brief for Plaintiff–Appellant, filed on Oct. 29, 2007, with the United States Court of Appeals for the Circuit Court, Appeal No. 2007–1215.

Deposition of Donald Schilling, PH.D. vol. I and II (videotaped), Monday 18, 2006, *Golden Bridge Technology, Inc. v. Nokia Inc and Lucent Technologies Inc*, U.S.D.Ct., E.D. Texas Marshall Division, Civil Action No. 2–05CV–151–LED., (video tape not supplied).

Report and Recommendation of United States Magistrate Judge, *Golden Bridge Technology, Inc. v. Nokia Inc and Lucent Technologies Inc*, U.S.D.Ct., E.D. Texas Marshall Division, Civil Action No. 2–05CV–151–LED.

Plaintiff Golden Bridge Technology, Inc.'s Objections to Report and Recommendation of United States Magistrate Judge, *Golden Bridge Technology, Inc. v. Nokia Inc and Lucent Technologies Inc*, U.S.D.Ct., E.D. Texas Marshall Division, Civil Action No. 2–05CV–151–LED.

"Order Adopting Report and Recommendation of United States Magistrate Judge", *Golden Bridge Technology, Inc. v. Nokia Inc and Lucent Technologies Inc*, U.S.D.Ct., E.D. Texas Marshall Division, Civil Action No. 2–05CV–151–LED.

Dong In Kim et al., "Random Assignment/Transmitter Oriented Code Scheme for Centralized DS/SSMA Packet Raido Networks," IEEE Journal on Selected Area in Communication, vol. 14, No. 8, Oct. 1996, pp. 1560–1568.

Riaz Esmailzadeh et al. "A New Slotted Aloha Based Random Access Method for CDMA Systems," IEEE, ICUPC 1997, pp. 43–47.

"UTRA Physical Layer Description FDD parts", Editor of UTRA/FDD physical layer description, Apr. 28, 1998, v0.1 Apr. 24, 1998, Tdoc SMG2 UMTS–L1 56/98.

"Power Ramping for Rach burst Transmission", Lucent Technologies Inc., Jun. 23–26, 1998, Tdoc SMG2 UMTS–L23 135/98.

"Power Ramping Rach Transmission for Utran", Lucent Technologies, Inc., Sep. 1–4, 1998, Tdoc SMG2 UMTS–L23 161/98.

"AiSMA (Acquired Indication Sense Multiple Access) for Rach Scheme", TTA, Nov. 9–12, 1998, Tdoc SMG UMTS–L1 504/98.

"Modification to Rach Scheme", Phillips Consumer Communications/Phillips Research Laboratories, Nov. 9–12, 1998, Tdoc SMG2 UMTS–L1 533/98.

"Comparisons of Power Ramping Schemes for Rach", Motorola, Oct./Nov. 1998, Tdoc SMG2 UMTS–L1 584/98.

"AiSMA with Fast Power Ramping for Prach Scheme", TTA, Dec. 14–18, 1998, Tdoc SMG2 UMTS–L1 829/98.

"The ETSI UMTS Terrestrial Radio Access (UTRA) ITU–R RTT Candidate Submission", SMG2, May/Jun. 1998, "Submission of Proposed Radio Transmission Technologies".

"Ericsson Comments on the GBT Convergence Proposal for WP–CDMA", Henrik Andreasson et al., Oct. 22, 1998, T1p1.5/98–528 TR46.1.98.10.27.07.

"A Proposal for Access Channel Structure and Procedures", TIA–TR45.5.3, Dec. 14–18, 1998, Tdoc SMG2 UMTS–L1 660/98.

"Report on the Random Access Ad Hoc Meeting", ETSI, Dec. 1998, Tdoc SMG2 UMTS–L1 760/98.

"Ericsson WP–CDMA Proposal", Stephen Hays, Oct. 27, 1998, T1P1.5/98–527 TR46.1.98.10.27.06.

"Mobile Station–Base Station Compatibility Standard for Wideband Spread Spectrum Cellular Systems", Telecommunications Industry Association, Approved: Feb. 3, 1999; Reaffirmed: Sep. 9, 2004, TIA–95–B (Reaffirmation of TIA/EIA–95–B).

Defendant's Preliminary Invalidity Contentions, *GBTI v. Nokia, Inc. and Lucent Technologies Inc.*, Civil Action No. 2–05CV0151–LED.

Defendant's Amended Preliminary Invalidity Contentions, *GBTI v. Nokia, Inc. and Lucent Technologies Inc.*, Civil Action No. 2–05CV0151–LED.

Joint Claim Construction and Prehearing Statement, *Golden Bridge Technology, Inc. v. Nokia, Inc.; and Lucent Technologies, Inc.*, Civil Action No. 2–05CV–151–LED.

Defendant's Responsive Claim Construction Brief, *Golden Bridge Technology, Inc. v. Nokia, Inc.; and Lucent Technologies, Inc.*, Civil Action No. 2–05CV–151–LED.

Plaintiff Golden Bridge Technology, Inc.'s Opening Claim Construction Brief, *Golden Bridge Technology, Inc. v. Nokia, Inc.; and Lucent Technologies, Inc.*, Civil Action No. 2–05CV–151–LED.

Kourosh Parsa, "Common Packet Channel (CPCH): The optimum wireless internet mechanism in W–CDMA," IEEE 2000, pp. 148–155.

U.S. District Court Order on Claim Construction, *Golden Bridge Technology, Inc. v. Nokia, Inc. and Lucent Technologies, Inc.*, Civil Action No. 2:05cv151.

Expert Report of Dr. Toby Berger on the Invalidity of the '267 Patent, Exhibits 1–28.

Rebuttal Report of Donald L. Schilling, Civil Action No. 2–05–CV–151 (LED).

ETSI Secretariat, "Report on Essential IPRs declared in relation to the work of SMG#26" (undated).

Videotaped Deposition of Emmanuel Kanterakis, Jun. 1, 2006, Civil Action No. 2–05–CV–151–LED.

Emmanuel Kanterakis Swom Examination by Mr. Famum, Jul. 28, 2006, Civil Action No. 2–05–CV–151–LED.

Videotaped Deposition of Kourosh Parsa, Jan. 23, 2006, Civil Action No. 2–05CV–151–LED.

Continued Videotaped Deposition of Kourosh Parsa, Jul. 29, 2008, Civil Action No. 2–05CV–151–LED.

Dalhma et al., UMTS/IMT—2000 Based on Wideband CDMA, IEEE Comm. Magazine, pp. 70–80, Sep. 1998.

Kourosh Parsa, Preamble Architecture for Closed Loop Power Control Isolated Packets in the UL Direction, TIA Committee TR 46.1 Contribution, Aug. 18, 1998, TR–46/98.8.18.

"Mobile Station—Base Station Compatibility Standard for Dual–Mode Wideband Spread Spectrum Cellular System," Telecommunications Industry Association (TIA) / Electronic Industry Association (EIA) Interim Standard 95–A, May 1995.

"Modification of the Current Rach Scheme for Increased Throughput," Ericsson, SMG2 UMTTS–L1 455/98, Oct. 14–16, 1998.

"Performance Evaluation of Different Random–Access Power–Ramping Schemes," Ericsson, SMG2 UMTS–L1 670/98, Dec. 14–18, 1998.

International Patent Application No. PCT/FI97/00316, Entitled, "Connection Establishment Method and Radio System," Häkkinen et al., Publication No. WO 97/46041, Dec. 4, 1997.

* cited by examiner

US 6,574,267 C1

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–12 and 27–29 is confirmed.

Claims 13–26 are cancelled.

New claims 30–60 are added and determinded to be patentable.

30. An improvement to a code-division-multiple-access (CDMA) system employing spread-spectrum modulation, with the CDMA system having a first base station (BS) with a first BS-spread-spectrum transmitter and a first BS-spread-spectrum receiver, a second base station with a second BS-spread-spectrum transmitter and a second BS-spread-spectrum receiver, and a plurality of remote stations, with each remote station (RS) having an RS-spread-spectrum transmitter and an RS-spread-spectrum receiver, the method comprising the steps of:

transmitting from said first BS-spread-spectrum transmitter located at said first base station, a first broadcast common-synchronization channel having a first common chip-sequence signal common to the plurality of remote stations, the first broadcast common-synchronization channel having a first frame-timing signal;

transmitting from said second BS-spread-spectrum transmitter located at said second base station, a second broadcast common-synchronization channel having a second common chip-sequence signal common to the plurality of remote stations, the second broadcast common-synchronization channel having a second frame-timing signals;

receiving at a first RS-spread-spectrum receiver the first broadcast common-synchronization channel, and determining a first frame timing at said first RS-spread-spectrum receiver from the first frame-timing signal;

receiving at the first RS-spread-spectrum receiver the second broadcast common-synchronization channel, and determining a second frame timing at said first RS-spread-spectrum receiver from the second frame-timing signal;

determining, based on any of power levels and probabilities of error, at said first RS-spread-spectrum receiver, from the first broadcast common-synchronization channel and from the second broadcast common-synchronization channel, to transmit to said first base station;

transmitting from a first RS-spread-spectrum transmitter to said first base station, a first access-burst signal;

receiving at said first BS-spread-spectrum receiver the first access-burst signal at a first detected-power level;

transmitting from said first BS-spread-spectrum transmitter to said first RS-spread-spectrum receiver, responsive to the first access-burst signal, a first layer one acknowledgment signal;

receiving at said first RS-spread-spectrum receiver the first layer one acknowledgment signal; and transmitting from said first RS-spread-spectrum transmitter, responsive to the first layer one acknowledgment signal, to said first BS-spread-spectrum receiver, a first spread-spectrum signal having data.

31. The improvement as set forth in claim 30, further including the step of transmitting from said first RS-spread-spectrum transmitter, any of data and control information, to said first BS-spread-spectrum receiver.

32. The improvement as set forth in claim 30, with the step of transmitting from the first RS-spread-spectrum transmitter the first access-burst signal, including the step of transmitting the first access-burst signal with a first plurality of segments having a first plurality of power levels increasing sequentially, respectively.

33. The improvement as set forth in claim 30, further including the steps of: determining, based on any of power levels and probabilities of error, at said first RS-spread-spectrum receiver, from the first broadcast common-synchronization channel and from the second broadcast common-synchronization channel, to transmit to said second base station;

transmitting from the first RS-spread-spectrum transmitter to said second base station, a second access-burst signal;

receiving at said second BS-spread-spectrum receiver the second access-burst signal at a second detected-power level;

transmitting from said second BS-spread-spectrum transmitter to said first RS-spread-spectrum receiver, responsive to the second access-burst signal, a second layer one acknowledgment signal;

receiving at said first RS-spread-spectrum receiver the second layer one acknowledgment signal; and transmitting from said first RS-spread-spectrum transmitter, responsive to the second layer one acknowledgment signal, to said second BS-spread-spectrum receiver, a second spread-spectrum signal having data.

34. The improvement as set forth in claim 33, further including the step of transmitting from said second RS-spread-spectrum transmitter, any of data and control information, to second said BS-spread-spectrum receiver.

35. The improvement as set forth in claim 33, with the step of transmitting from the first RS-spread-spectrum transmitter the second access-burst signal, including the step of transmitting the second access-burst signal with a second plurality of segments having a second plurality of power levels increasing sequentially, respectively.

36. An improvement to a code-division-multiple-access (CDMA) system employing spread-spectrum modulation, with the CDMA system having a first base station (BS), a second base station, and a plurality of remote stations, with each remote station (RS) having an RS-spread-spectrum transmitter and an RS-spread-spectrum receiver, the improvement comprising:

a first BS-spread-spectrum transmitter located at said first base station, for transmitting a first broadcast common-synchronization channel having a first common chip-sequence signal common to the plurality of remote stations, the first broadcast common-synchronization channel having a first frame-timing signal;

a second BS-spread-spectrum transmitter located at said second base station, for transmitting a second broadcast common-synchronization channel having a second common chip-sequence signal common to the plurality of remote stations, the second broadcast common-synchronization channel having a second frame-timing signal;

a first RS-spread-spectrum receiver, located at a first remote station of the plurality of remote stations, for receiving the first broadcast common-synchronization channel, and determining first frame timing at said first RS-spread-spectrum receiver from the first frame-timing signal;

said first RS-spread-spectrum receiver for receiving the second broadcast common-synchronization channel, and determining a second frame timing at said first RS-spread-spectrum receiver from the second frame-timing signal;

means, based on any of power levels and probabilities of error, located at said first RS-spread-spectrum receiver, for determining from the first broadcast common-synchronization channel and from the second broadcast common-synchronization channel, to transmit to said first base station;

a first RS-spread-spectrum transmitter, located at said first remote station of said plurality of remote stations, for transmitting a first access-burst signal;

said first BS-spread-spectrum receiver for receiving the access-burst signal at a detected-power level;

said first BS-spread-spectrum transmitter for transmitting to said first RS-spread-spectrum receiver, responsive to receiving the first access-burst signal, a first layer one acknowledgment signal;

said first RS-spread-spectrum receiver for receiving the first layer one acknowledgment signal; and said first RS-spread-spectrum transmitter, responsive to the first layer one acknowledgment signal, for transmitting to said first BS-spread-spectrum receiver, a first spread-spectrum signal having data.

37. The improvement as set forth in claim 36, with said first RS-spread-spectrum transmitter for transmitting any of data and control information, to said BS-spread-spectrum receiver.

38. The improvement as set forth in claim 37, with said first RS-spread-spectrum transmitter for transmitting the first access-burst signal with a first plurality of segments having a first plurality of power levels increasing sequentially, respectively.

39. The improvement as set forth in claim 36, further including: said means for determining, based on any of power levels and probabilities of error, at said first RS-spread-spectrum receiver, from the first broadcast common-synchronization channel and from the second broadcast common-synchronization channel, to transmit to said second base station;

said first RS-spread-spectrum transmitter for transmitting to said second base station, a second access-burst signal;

said second BS-spread-spectrum receiver for receiving the second access-burst signal at a second detected-power level;

said second BS-spread-spectrum transmitter for transmitting to said first RS-spread-spectrum receiver, responsive to the second access-burst signal, a second layer one acknowledgment signal;

said first RS-spread-spectrum receiver for receiving the second layer one acknowledgment signal; and said first RS-spread-spectrum transmitter, responsive to the second layer one acknowledgment signal, for transmitting to said second BS-spread-spectrum receiver, a second spread-spectrum signal having data.

40. The improvement as set forth in claim 39, with said first RS-spread-spectrum transmitter for transmitting the second access-burst signal with a second plurality of segments having a second plurality of power levels increasing sequentially, respectively.

41. The improvement as set forth in claim 39, with said second RS-spread-spectrum transmitter for transmitting any of data and control information, to said second BS-spread-spectrum receiver.

42. A method of transferring packet data for a mobile station (MS) with an MS receiver and an MS transmitter, comprising:

receiving at the MS receiver a broadcast common channel from a base station;

determining a plurality of parameters required for transmission to the base station;

spreading an access preamble selected from a set of pre-defined preambles;

transmitting from the MS transmitter the spread access preamble, at a first discrete power level;

if no layer one acknowledgement corresponding to the access preamble is detected, transmitting a spread access preamble from the MS transmitter at a second discrete power level higher than the first discrete power level; and upon detecting a layer one acknowledgement corresponding to a transmitted access preamble, ceasing preamble transmission and transmitting the packet data from the MS transmitter.

43. The method of claim 42, further comprising one or more additional steps of transmitting a spread access preamble at a successively higher power if no layer one acknowledgement corresponding to any of the preamble transmissions is received, up to a maximum allowed number of preamble transmissions.

44. A code-division-multiple-access (CDMA) wireless handset, comprising:

a CDMA transmitter;

a CDMA receiver; and a controller coupled to the CDMA receiver for responding to signals received via the CDMA receiver and coupled for controlling the CDMA transmitter, such that in operation the CDMA handset is for performing the following steps:

spreading an access preamble selected from a set of pre-defined preambles;

transmitting the spread access preamble, at a first discrete power level to a base station;

if no layer one acknowledgement corresponding to the access preamble is detected, transmitting a spread access preamble from the MS transmitter at a second discrete power level higher than the first discrete power level; and upon detecting a layer one acknowledgement corresponding to a transmitted access preamble, ceasing preamble transmission and transmitting packet data from the MS transmitter.

45. The improvement as set forth in claim 1, further including the step of: selecting one of a plurality of preambles assigned to said first base station; wherein:

the first access-burst signal comprises the selected one of the preambles assigned to said first base station; and the first layer one acknowledgment signal is a layer one acknowledgement signal corresponding to the selected one of the preambles assigned to said first base station.

46. The improvement as set forth in claim 7, wherein:

the first access-burst signal comprises a preamble selected from among a plurality of preambles assigned to said first base station; and the first layer one acknowledgment signal is a layer one acknowledgement signal corresponding to the selected one of the preambles assigned to said first base station.

47. A base-band processor, for use in a code-division-multiple-access (CDMA) wireless base station having a modulator and a demodulator, the base-band processor comprising:

a preamble processor, coupled to the demodulator, for detecting a preamble in a received spread-spectrum signal;

a data processor, coupled to the demodulator, for detecting and processng any data contained in the received spread-spectrum signal;

an encoder, for encoding data; an interleaver, coupled to the encoder, for interleaving encoded data; packet a packet formatter, coupled to the interleaver, for formatting the interleaved data into a packet; and a controller coupled to the preamble processor and coupled for controlling the modulator, the data processor and the packet formatter, such that in operation the base-band processor is for performing the following steps:

detecting a first one of a sequence of coded preamble signals embedded in a first spread-spectrum signal received at an adequate power level;

upon detection of the first coded preamble signal at the adequate power level, generating a packet comprising an acknowledgement signal, and outputting the packet comprising the acknowledgement signal to the modulator; and processing a packet, comprising data, from a second received spread-spectrum signal, wherein:

the first coded preamble comprises one preamble from among a plurality of preambles assigned to said base station; and the first layer one acknowledgment signal is a layer one acknowledgement signal corresponding to the one preamble from among the plurality of preambles assigned to said base station.

48. A base-band processor, for use in a code-division-multiple-access (CDMA) wireless handset having a spread-spectrum modulator and a spread-spectrum demodulator, the base-band processor, comprising:

an acknowledgment detector, coupled to the demodulator, for detecting an acknowledgment in a received spread-spectrum signal;

an encoder, for encoding data;

an interleaver, coupled to the encoder, for interleaving encoded data;

a preamble generator for generating a preamble;

a multiplexer, coupled to the interleaver and to the preamble generator, for multiplexing the interleaved data and the preamble;

a packet formatter, coupled to the multiplexer, for formatting the multiplexed data and preamble into one or more packets; and a controller coupled to the acknowledgment detector and coupled for controlling the modulator, the preamble generator, the multiplexer and the packet formatter, such that in operation the base-band processor is for performing the following steps:

generating and outputting to the modulator a plurality of packets comprising a sequence of coded preamble signals at sequentially increasing discrete power levels;

detecting an acknowledgement in a received spread-spectrum signal; and upon detection of the acknowledgement, outputting a packet comprising data to the modulator for transmission over a random access wireles channel, wherein:

each of the coded preamble signals contains a preamble selected from among a plurality of preambles assigned to a base station; and the detected layer one acknowledgement corresponds to a preamble selected from among the plurality of preambles assigned to said base station contained in one of the coded preamble signals.

49. A method of operation of a code-division-multiple-access (CDMA) system employing spread-spectrum modulation, with the CDMA system having a base station (BS) with a BS-spread-spectrum transmitter and a BS-spread-spectrum receiver, and a plurality of remote stations, with each remote station (RS) having an RS-spread spectrum transmitter and an RS-spread-spectrum receiver, the method comprising the steps of:

transmitting a broadcast common-synchronization channel, from the BS-spread-spectrum transmitter located at the base station to the plurality of remote stations;

receiving at a first RS-spread-spectrum receiver the broadcast common-synchronization channel, and determining a plurality of parameters required for transmission to the base station;

transmitting from a first RS-spread-spectrum transmitter a first preamble at a first discrete power level;

if no acknowledgment corresponding to the previously transmitted preamble is received at the first RS-spread-spectrum receiver by a time following the transmission of the first preamble, transmitting from the first RS-spread-spectrum transmitter a second preamble at a second discrete power level that is higher than the first discrete power level;

receiving the second preamble, at a detected-power level, at the BS-spread-spectrum receiver;

transmitting an acknowledgment of the received preamble from the BS-spread-spectrum transmitter;

receiving the acknowledgment at the first RS-spread-spectrum receiver; and transmitting a spread-spectrum signal having data from the first RS-spread spectrum transmitter to the BS-spread-spectrum receiver, responsive to the receipt of the acknowledgment, wherein:

each transmitted preamble comprises a preamble selected from among a plurality of preambles assigned to said base station; and the layer one acknowledgement corresponds to said received preamble.

50. A method of communication through a code-division-multiple-access (CDMA) system employing spread-spectrum modulation, with the CDMA system having a base station (BS) with a BS-spread-spectrum transmitter and a BS-spread-spectrum receiver, and a plurality of remote stations, with each remote station (RS) having an RS-spread spectrum transmitter and an RS-spread-spectrum receiver, the method comprising the steps of:

receiving a broadcast common-synchronization channel from the BS-spread-spectrum transmitter located at the RS-spread-spectrum receiver of one of the remote stations, and determining a plurality of parameters required for transmission to the base station;

transmitting a preamble at a discrete power level from the RS-spread-spectrum transmitter of the one remote station;

listening for an acknowledgment corresponding to the transmitted preamble at the RS-spread-spectrum receiver of the one remote station;

if an acknowledgment is not received, upon expiration of a predetermined interval, following the transmission of the preamble, increasing power level to a new discrete power level, and repeating the transmitting step and continuing the listening step;

upon receiving an acknowledgment at the RS-spread-spectrum receiver of the one remote station, ceasing preamble transmission and transmitting a spread-spectrum signal having data from the RS-spread-spectrum transmitter of the one remote station, for the BS-spread-spectrum receiver, wherein:

each preamble transmission comprises a preamble selected from among a plurality of preambles assigned to said base station; and the layer one acknowledgement corresponds to a transmitted preamble.

51. The method of claim 27, wherein each spread access preamble comprises a preamble selected from among a plurality of preambles assigned to said base station.

52. The CDMA wireless handset of claim 29, wherein each spread access preamble comprises preamble selected from among a plurality of preambles assigned to said base station.

53. The improvement as set forth in claim 30, further including the step of:

selecting one of a plurality of preambles assigned to said first base station; wherein:

the first access-burst signal comprises the selected one of the preambles assigned to said first base station; and the first layer one acknowledgment signal is a layer one acknowledgement signal corresponding to the selected one of the preambles assigned to said first base station.

54. The improvement asset forth in claim 36, wherein: the first access-burst signal comprises a preamble selected from among a plurality of preambles assigned to said first base station; and the first layer one acknowledgment signal is a layer one acknowledgement signal corresponding to the selected one of the preambles assigned to said first base station.

55. A base-band processor, for use in a code-division-multiple-access (CDMA) wireless base station having a modulator and a demodulator, the base-band processor comprising:

a preamble processor, coupled to the demodulator, for detecting a preamble in a received spread-spectrum signal;

a data processor, coupled to the demodulator, for detecting and processing any data contained in the received spread-spectrum signal;

an encoder, for encoding data;

an interleaver, coupled to the encoder, for interleaving encoded data;

a packet formatter, coupled to the interleaver, for formatting the interleaved data into a packet; and a controller coupled to the preamble processor and coupled for controlling the modulator, the data processor and the packet formatter, such that in operation the base-band processor is for performing the following steps:

detecting a first one of a sequence of coded preamble signals embedded in a first spread-spectrum signal received at an adequate power level;

upon detection of the first coded preamble signal at the adequate power level, generating a packet comprising a layer one acknowledgement signal, and outputting the packet comprising the layer one acknowledgement signal to the modulator; and processing a packet, comprising data, from a second received spread-spectrum signal, wherein:

the first coded preamble comprises one preamble from among a plurality of preambles assigned to said base station; and the first layer one acknowledgment signal is a layer one acknowledgement signal corresponding to the one preamble from among the plurality of preambles assigned to said base station.

56. A base-band processor, for use in a code-division-multiple-access (CMDA) wireless handset having a spread-spectrum modulator and a spread-spectrum demodulator, the base-band processor, comprising:

an acknowledgment detector, coupled to the demodulator, for detecting a layer one acknowledgment in a received spread-spectrum signal;

an encoder, for encoding data;

an interleaver, coupled to the encoder, for interleaving encoded data;

a preamble generator for generating a preamble;

a multiplexer, coupled to the interleaver and to the preamble generator, for multiplexing the interleaved data and the preamble;

a packet formatter, coupled to the multiplexer, for formatting the multiplexed data and preamble into one or more packets; and a controller coupled to the acknowledgment detector and coupled for controlling the modulator, the preamble generator, the multiplexer and the packet formatter, such that in operation the base-band processor is for performing the following steps:

generating and outputting to the modulator a plurality of packets comprising a sequence of coded preamble signals at sequentially increasing discrete power levels;

detecting a layer one acknowledgement in a received spread-spectrum signal; and upon detection of the layer one acknowledgement, outputting a packet comprising data to the modulator for transmission over a random access wireless channel, wherein:

each of the coded preamble signals contains a preamble selected from among a plurality of preambles assigned to a base station; and the detected layer one acknowledgement corresponds to a preamble selected from among the plurality of preambles assigned to said base station contained in one of the coded preamble signals.

57. A method of operation of a code-division-multiple-access (CDMA) system employing spread-spectrum modulation, with the CDMA system having a base station (BS) with a BS-spread-spectrum transmitter and a BS-spread-spectrum receiver, and a plurality of remote stations, with each remote station (RS) having an RS-spread spectrum transmitter and an RS-spread-spectrum receiver, the method comprising the steps of:

transmitting a broadcast common-synchronization channel, from the BS-spread-spectrum transmitter located at the base station to the plurality of remote stations;

receiving at a first RS-spread-spectrum receiver the broadcast common-synchronization channel, and determining a plurality of parameters required for transmission to the base station;

transmitting from a first RS-spread-spectrum transmitter a first preamble at a first discrete power level;

if no layer one acknowledgment corresponding to the previously transmitted preamble is received at the first RS-spread-spectrum receiver by a time following the transmission of the first preamble, transmitting from the first RS-spread-spectrum transmitter a second preamble at a second discrete power level that is higher than the first discrete power level;

receiving the second preamble, at a detected-power level, at the BS-spread-spectrum receiver;

transmitting a layer one acknowledgment of the received preamble from the BS-spread-spectrum transmitter;

receiving the layer one acknowledgment at the first RS-spread-spectrum receiver; and transmitting a spread-spectrum signal having data from the first RS-spread spectrum transmitter to the BS-spread-spectrum receiver, responsive to the receipt of the layer one acknowledgment, wherein:

each transmitted preamble comprises a preamble selected from among a plurality of preambles assigned to said base station; and the layer one acknowledgement corresponds to said received preamble.

58. A method of communication through a code-division-multiple-access (CDMA) system employing spread-spectrum modulation, with the CDMA system having a base station (BS) with a BS-spread-spectrum transmitter and a BS-spread-spectrum receiver, and a plurality of remote stations, with each remote station (RS) having an RS-spread spectrum transmitter and an RS-spread-spectrum receiver, the method comprising the steps of:

receiving a broadcast common-synchronization channel from the BS-spread-spectrum transmitter located at the RS-spread-spectrum receiver of one of the remote stations, and determining a plurality of parameters required for transmission to the base station;

transmitting a preamble at a discrete power level from the RS-spread-spectrum transmitter of the one remote station;

listening for a layer one acknowledgment corresponding to the transmitted preamble at the RS-spread-spectrum receiver of the one remote station;

if a layer one acknowledgment is not received, upon expiration of a predetermined interval, following the transmission of the preamble, increasing power level to a new discrete power level, and repeating the transmitting step and continuing the listening step; and upon receiving a layer one acknowledgment at the RS-spread-spectrum receiver of the one remote station, ceasing preamble transmission and transmitting a spread-spectrum signal having data from the RS-spread-spectrum transmitter of the one remote station, for the BS-spread-spectrum receiver, wherein:

each preamble transmission comprises a preamble selected from among a plurality of preambles assigned to said base station; and the layer one acknowledgement corresponds to a transmitted preamble.

59. The method of claim 42, wherein each spread access preamble comprises a preamble selected from among a plurality of preambles assigned to said base station.

60. The CDMA wireless handset of claim 44, wherein each spread access preamble comprises preamble selected from among a plurality of preambles assigned to said base station.

\* \* \* \* \*